United States Patent [19]
Reimers et al.

[11] 3,927,976
[45] Dec. 23, 1975

[54] CONTAINERIZED HYDROSTATIC STERILIZING SYSTEM

[75] Inventors: James L. Reimers, Saratoga; Rodney D. Miller, San Jose, both of Calif.

[73] Assignee: FMC Corporation, San Jose, Calif.

[22] Filed: Sept. 26, 1973

[21] Appl. No.: 400,997

[52] U.S. Cl. .......................... 21/80; 21/56; 21/78; 21/94; 99/361; 426/407; 426/511; 426/521; 426/523
[51] Int. Cl.².... A23L 3/00; A23L 3/04; B65B 55/02
[58] Field of Search ..................... 21/78–80, 56, 21/93, 94; 426/407, 511, 521, 523; 99/362, 360, 361, 363, 364, 365, 366, 367, 368, 369, 370, 371; 198/131, 76, 102

[56] References Cited
UNITED STATES PATENTS

| | | | |
|---|---|---|---|
| 1,891,425 | 12/1932 | Kronquest | 99/361 X |
| 2,026,022 | 12/1935 | Devers | 99/361 |
| 2,154,978 | 4/1939 | Galvin | 99/361 |
| 2,385,828 | 10/1945 | Mehlwe et al. | 99/361 |
| 2,660,512 | 11/1953 | Webster | 21/56 |
| 2,893,536 | 7/1959 | Jones | 21/80 UX |
| 3,045,805 | 7/1962 | Shappell | 198/76 |
| 3,058,177 | 10/1962 | Taylor et al. | 21/79 |
| 3,078,979 | 2/1963 | Block et al. | 198/82 |
| 3,161,526 | 12/1964 | Mencacci | 99/370 X |
| 3,268,055 | 8/1966 | Stew et al. | 198/102 X |
| 3,286,619 | 11/1966 | Lee | 21/80 X |
| 3,340,791 | 9/1967 | Mencacci et al. | 21/93 UX |
| 3,408,922 | 11/1968 | Mencacci et al. | 21/80 X |
| 3,469,988 | 9/1969 | Yawger | 426/407 |
| 3,587,819 | 6/1971 | Deakin et al. | 198/131 X |
| 3,606,995 | 9/1971 | Hemel | 21/56 X |
| 3,619,126 | 11/1971 | Carvallo | 21/78 X |
| 3,812,270 | 5/1974 | Hartz | 426/521 X |

FOREIGN PATENTS OR APPLICATIONS
286,583  2/1965  Netherlands

Primary Examiner—Barry S. Richman
Assistant Examiner—Bradley R. Garris
Attorney, Agent, or Firm—C. E. Tripp

[57] ABSTRACT

A hydrostatic cooker includes a primary carrier chain running through inlet and outlet water legs and a secondary chain running through an intermediate steam-processing leg, with detachable carrier baskets moved through the legs by the chains. By synchronously driving the two chains at differential velocities, widely spaced carrier baskets on the primary chain can be transferred to and from the secondary chain in closely spaced relation for transit through the steam-processing leg. A reciprocable transfer carriage at the lower ends of the legs simultaneously receives an incoming carrier basket from the inlet water leg and a carrier basket which has passed through the steam leg to process its containers, upon which the carriage shifts to deliver the incoming carrier basket to the steam leg, and the carrier basket with the processed containers to the outlet water leg.

15 Claims, 40 Drawing Figures

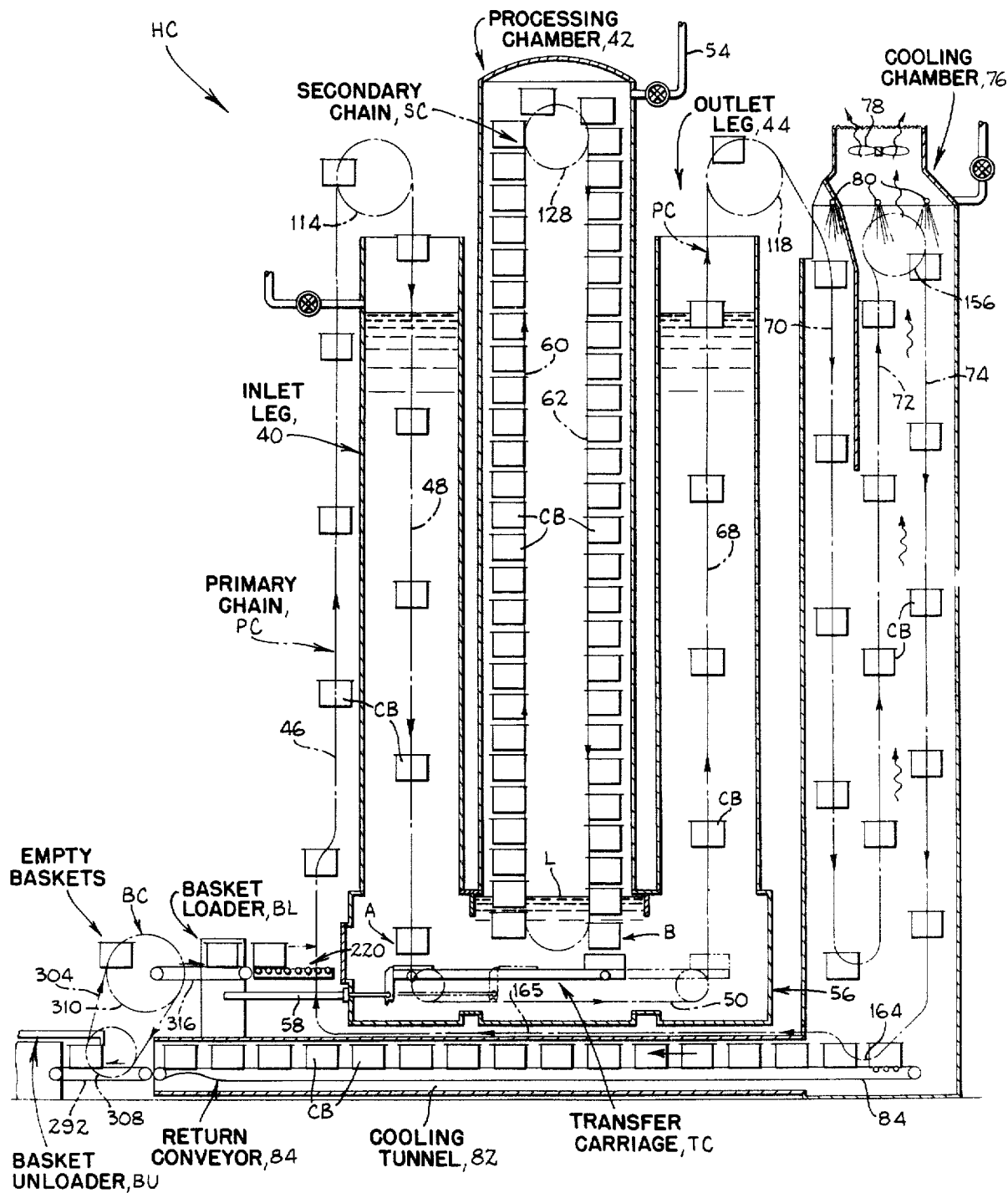

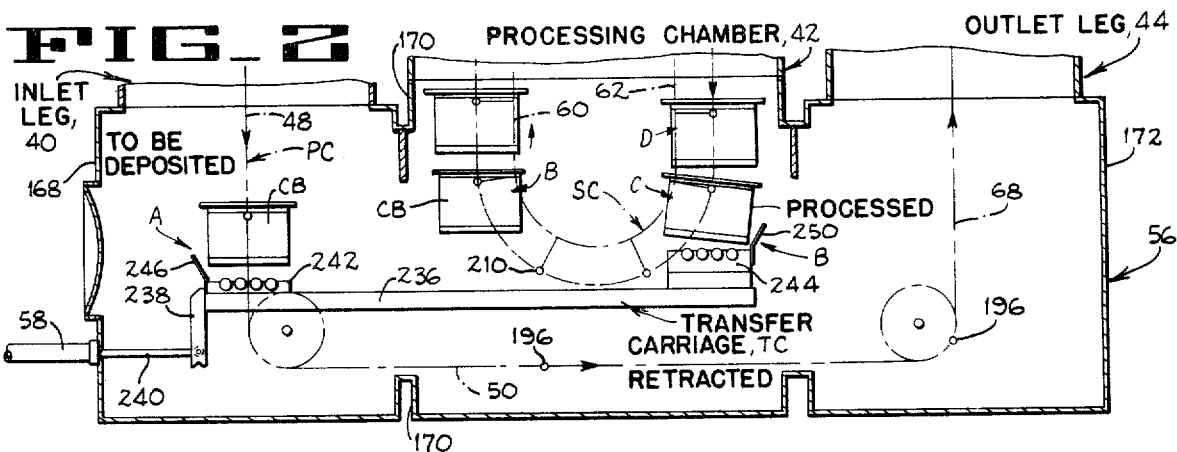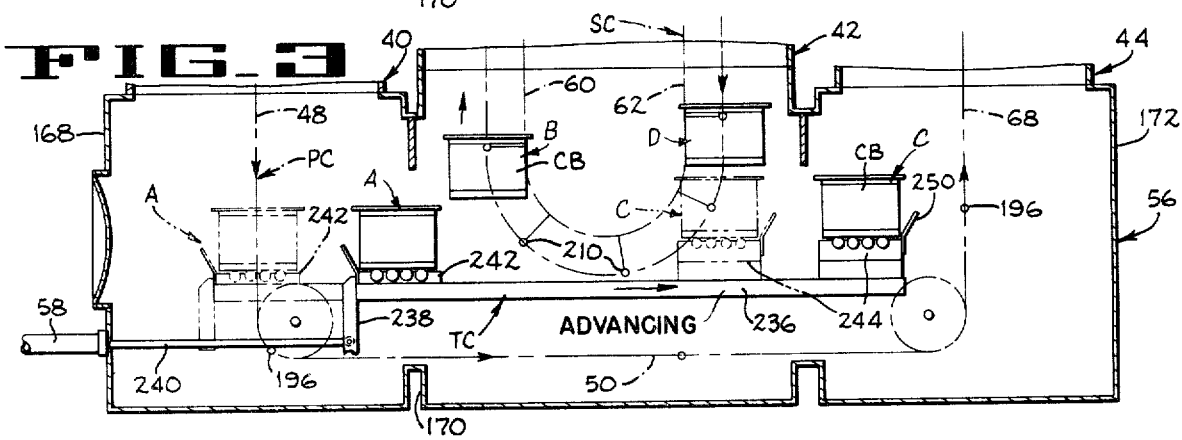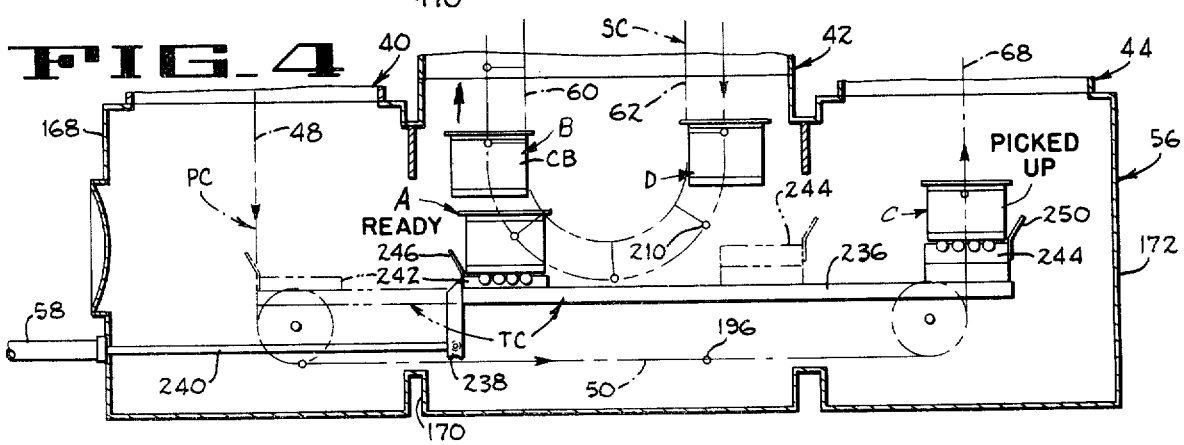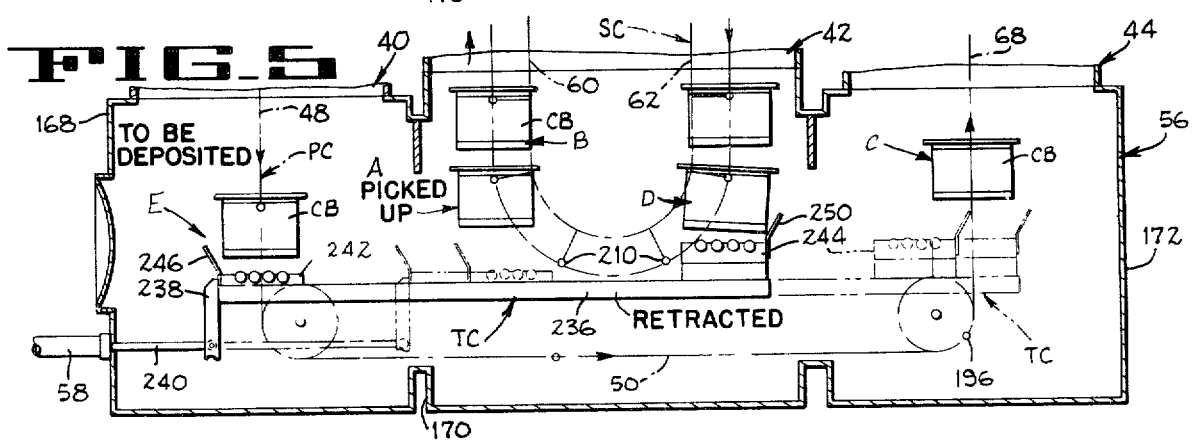

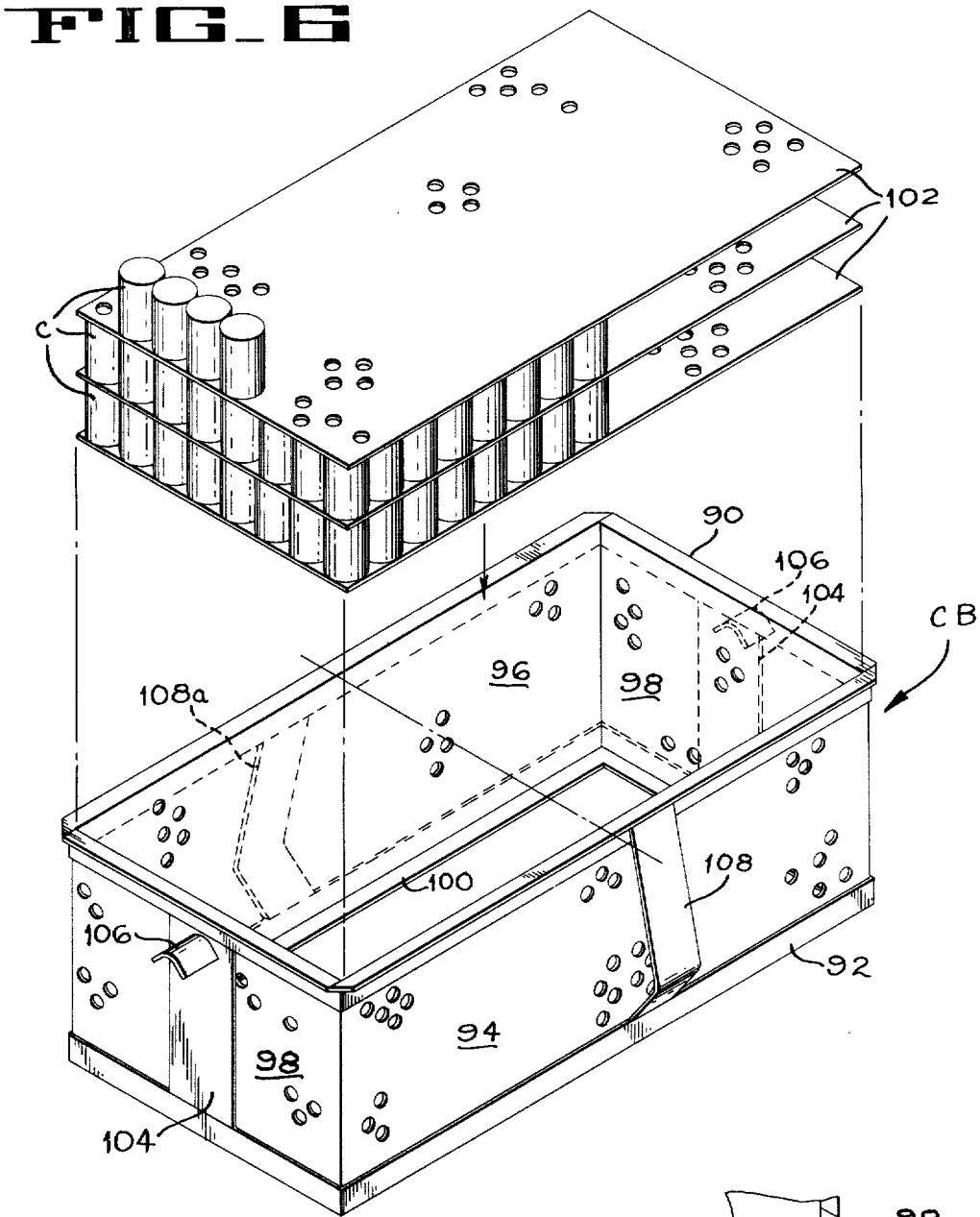
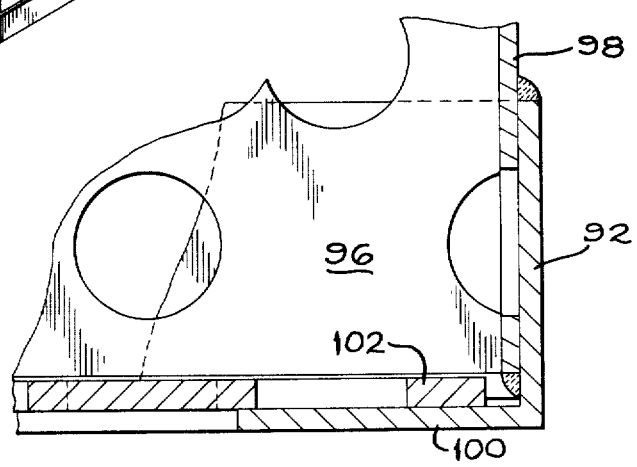

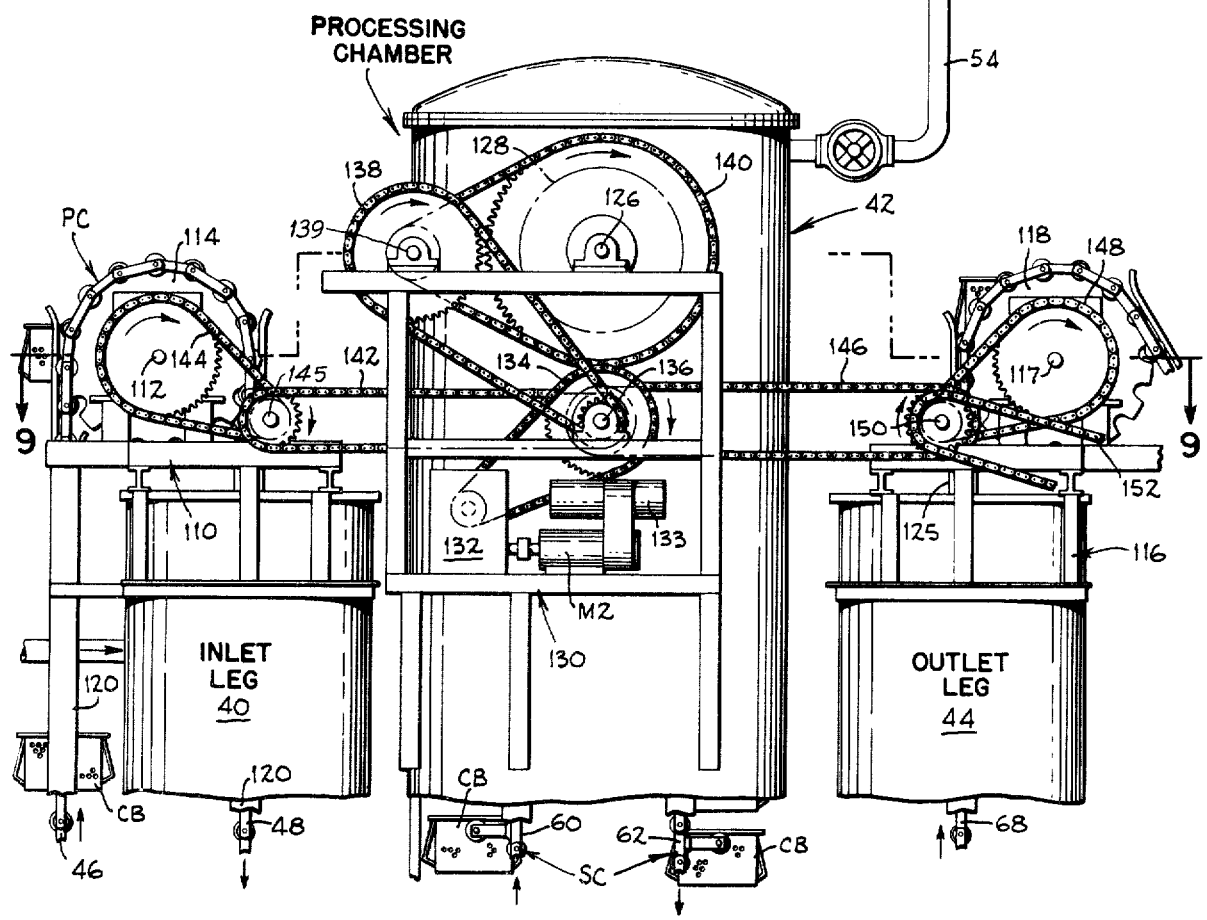
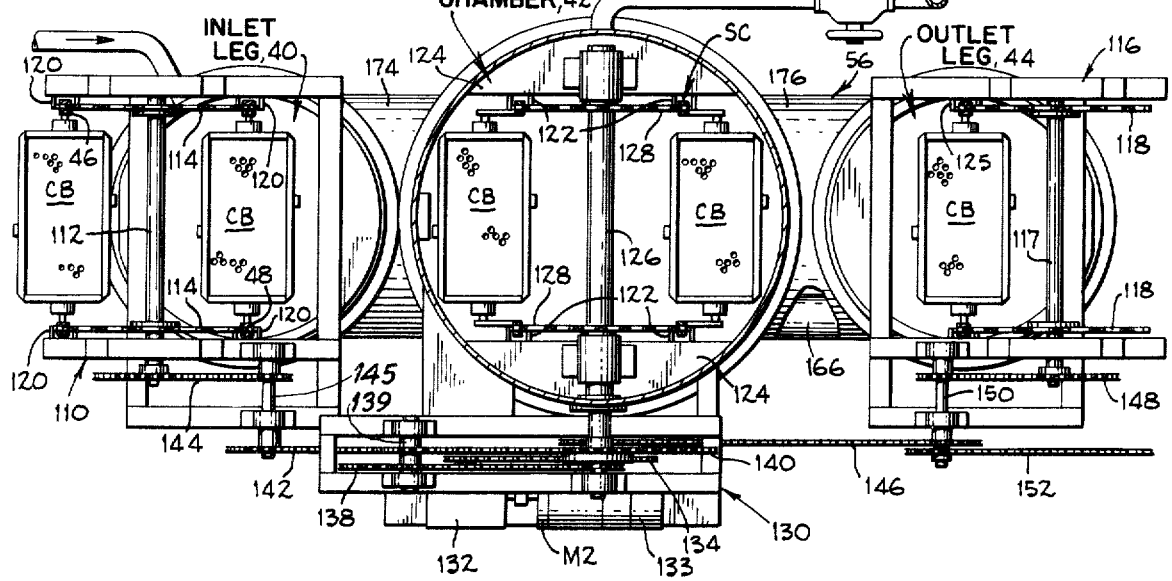

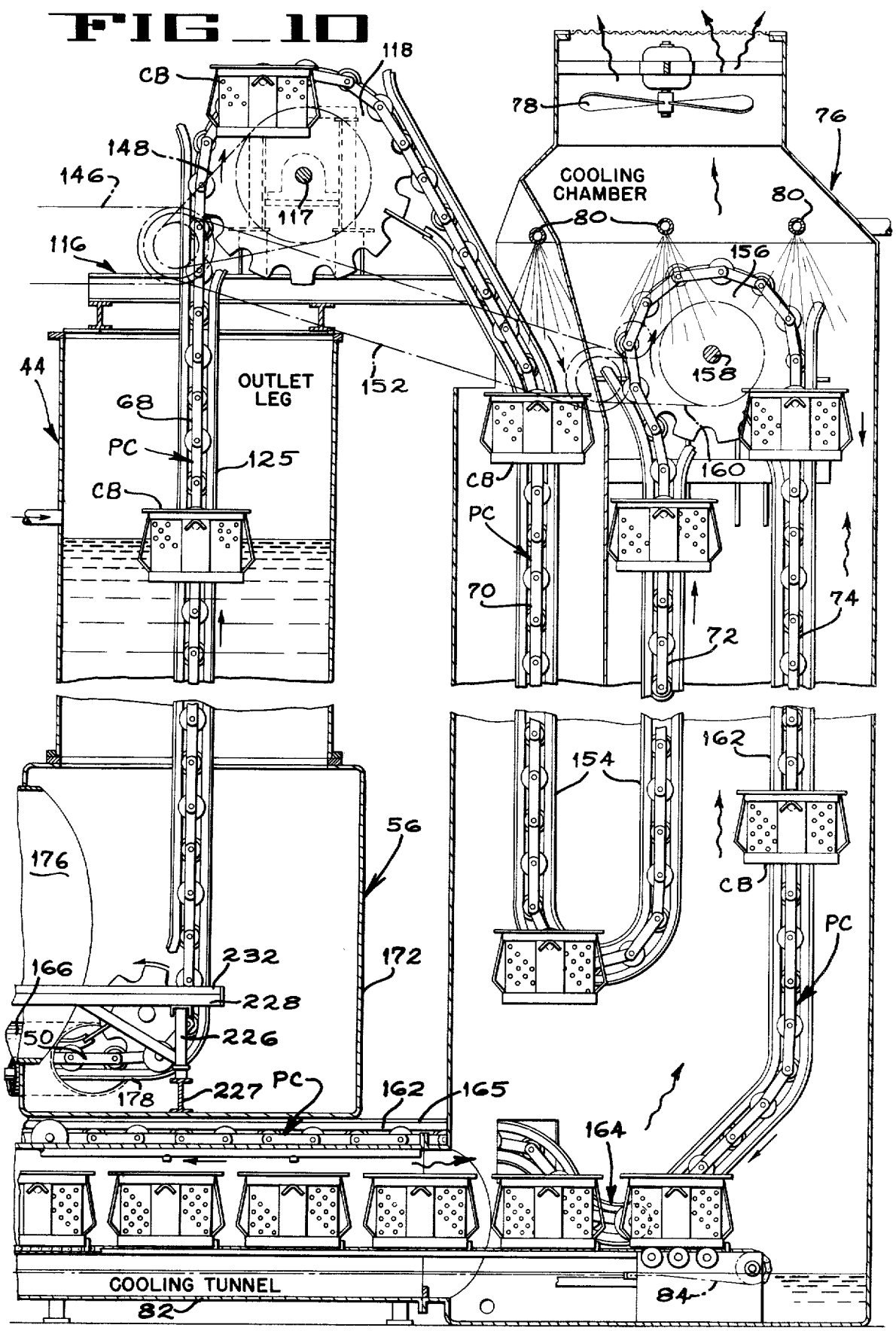

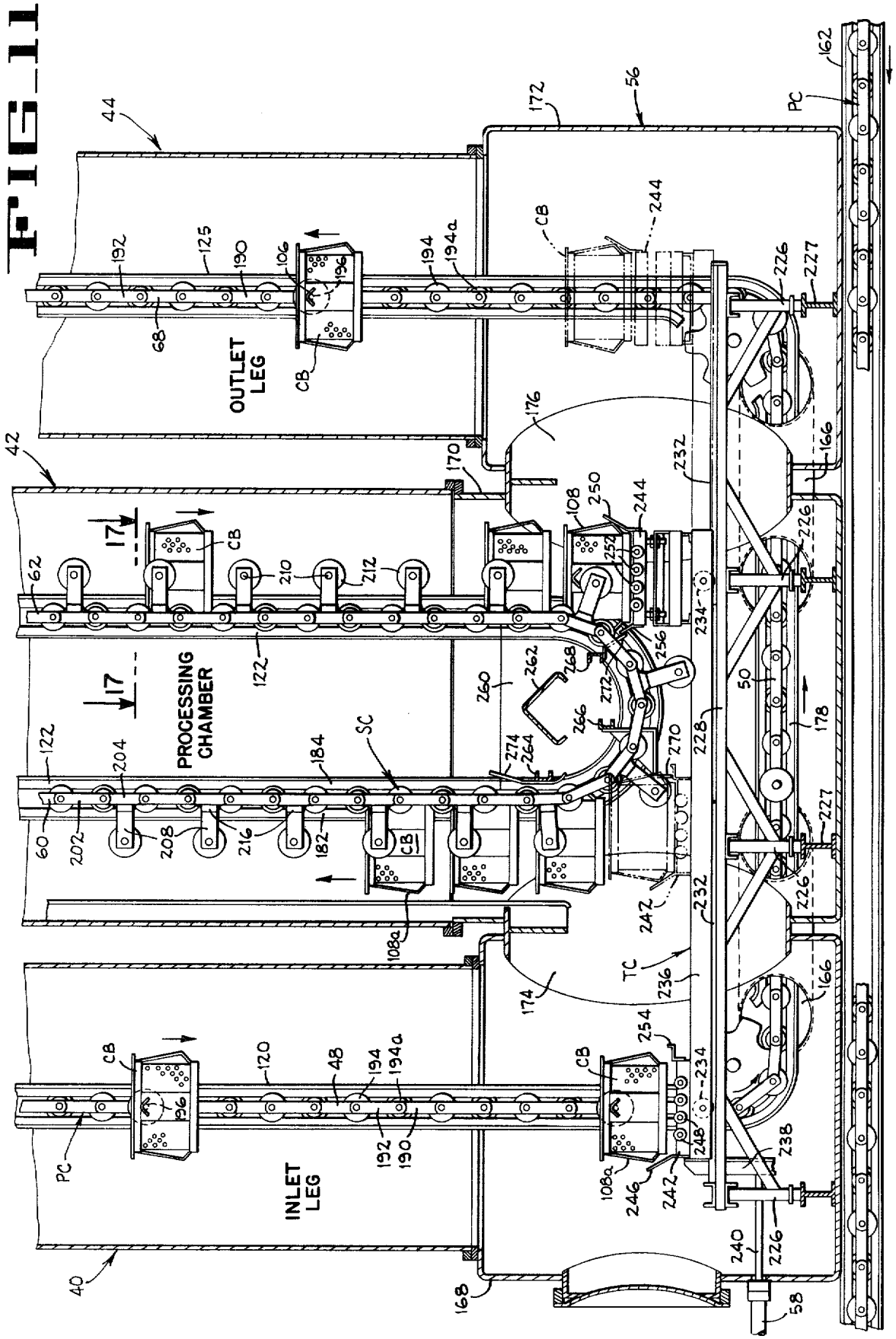

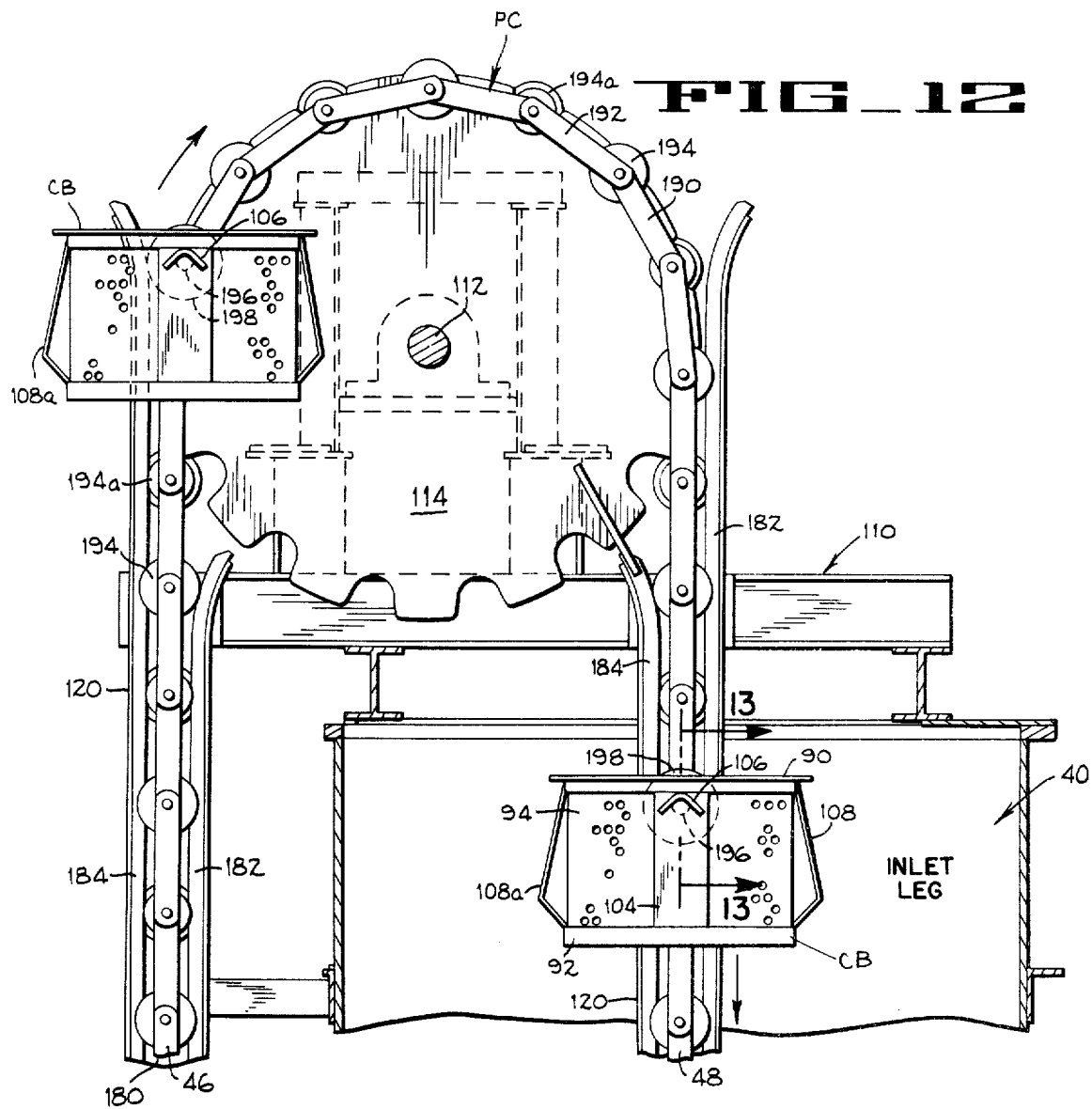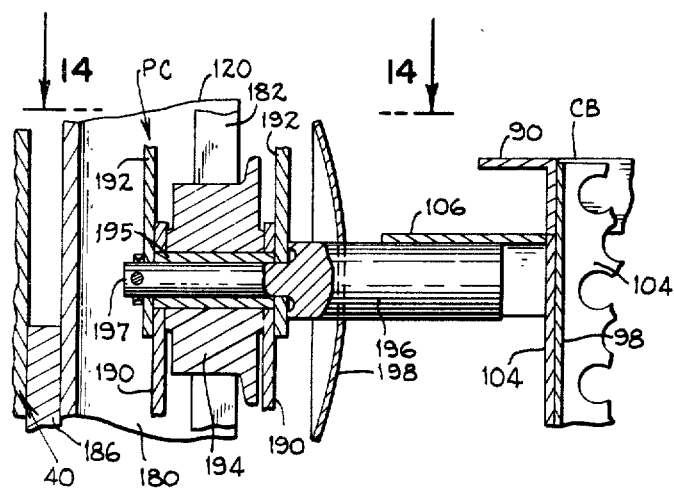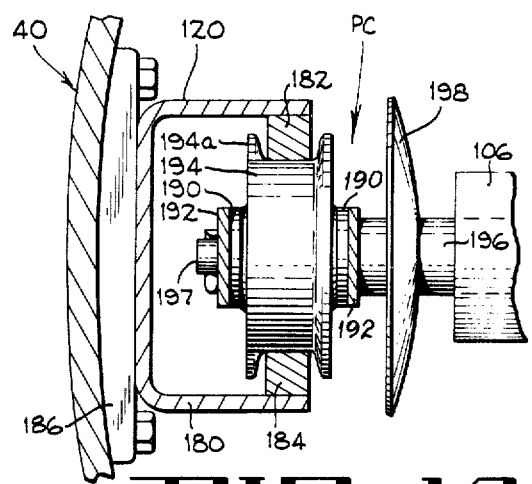

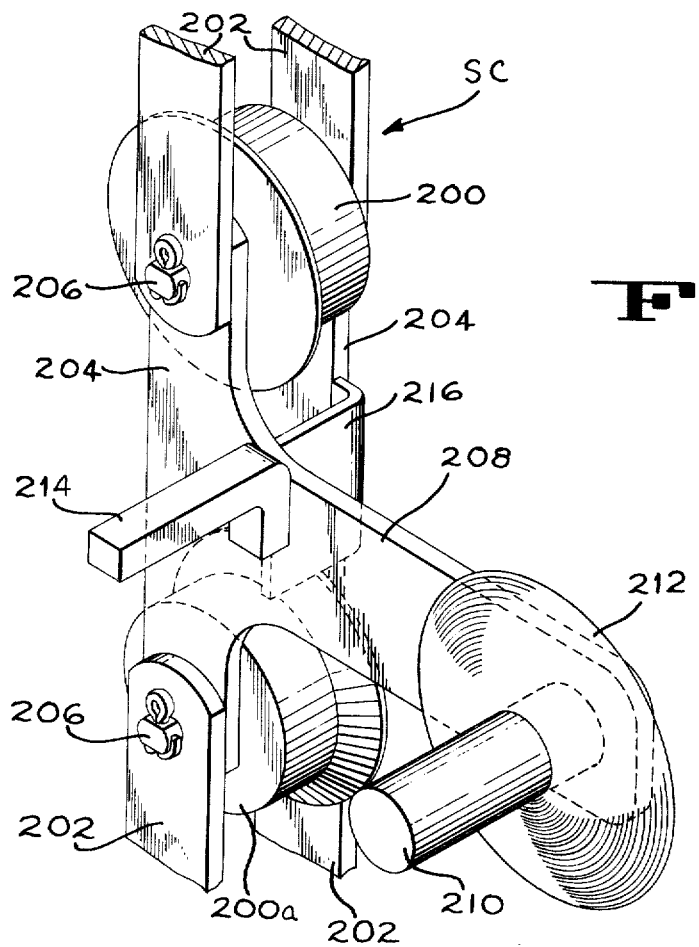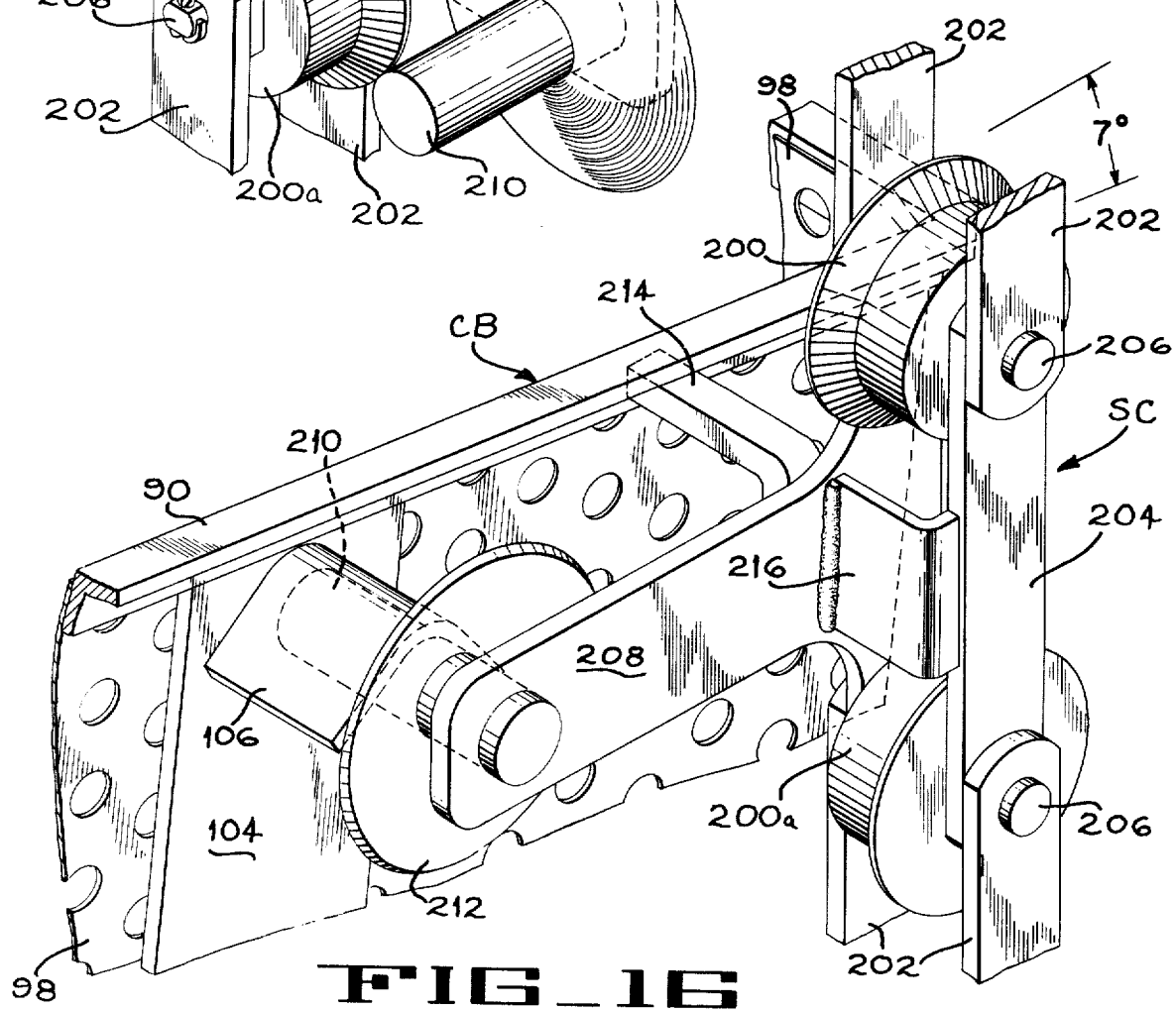

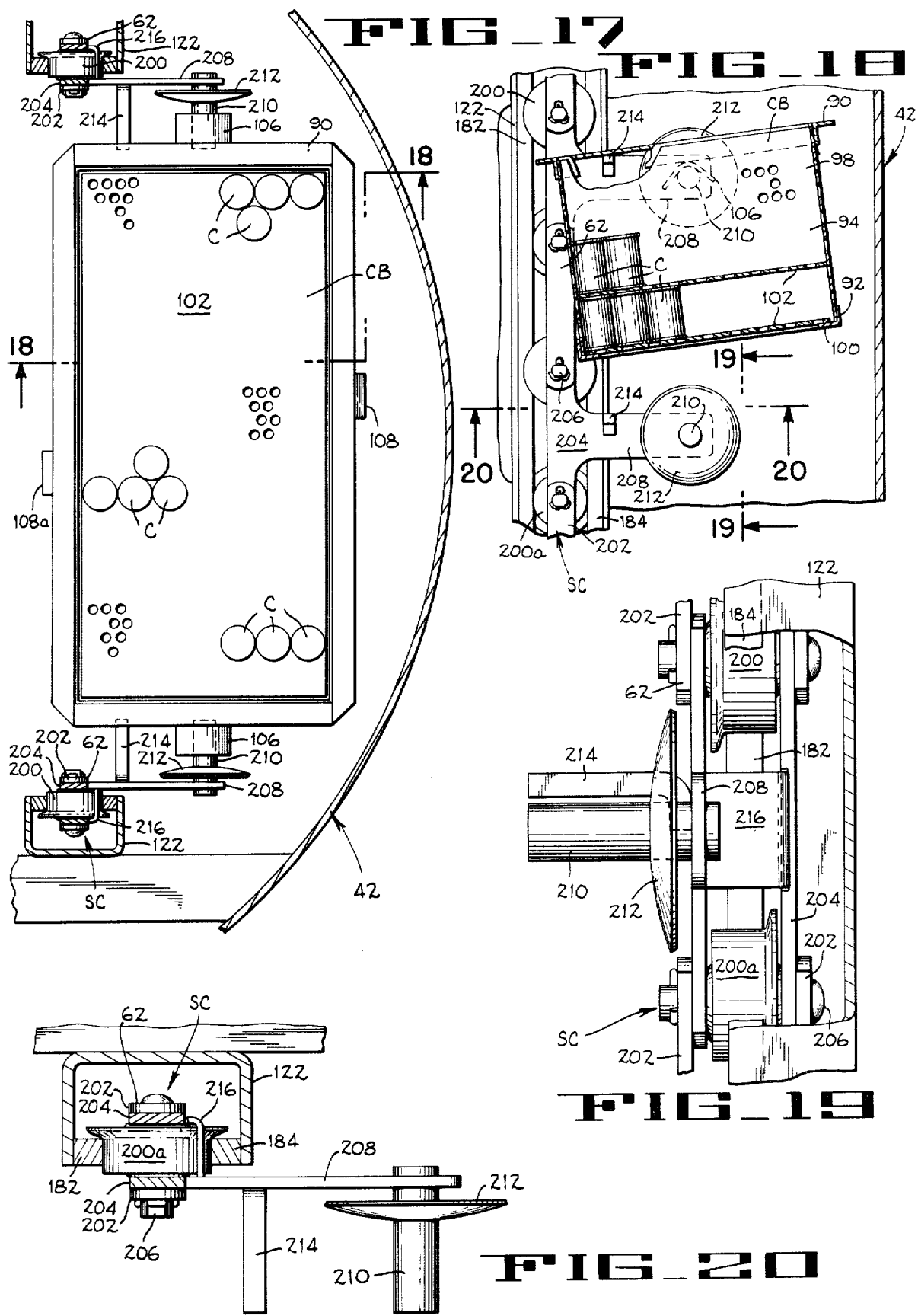

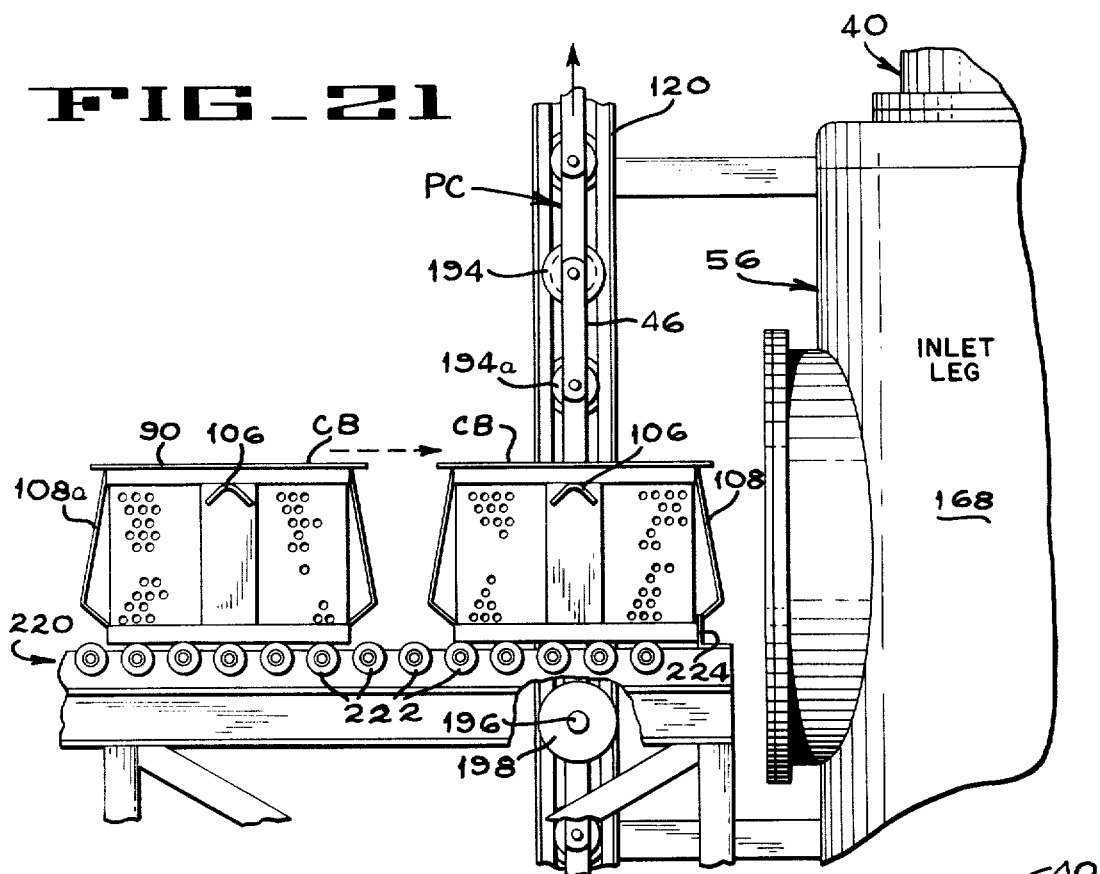
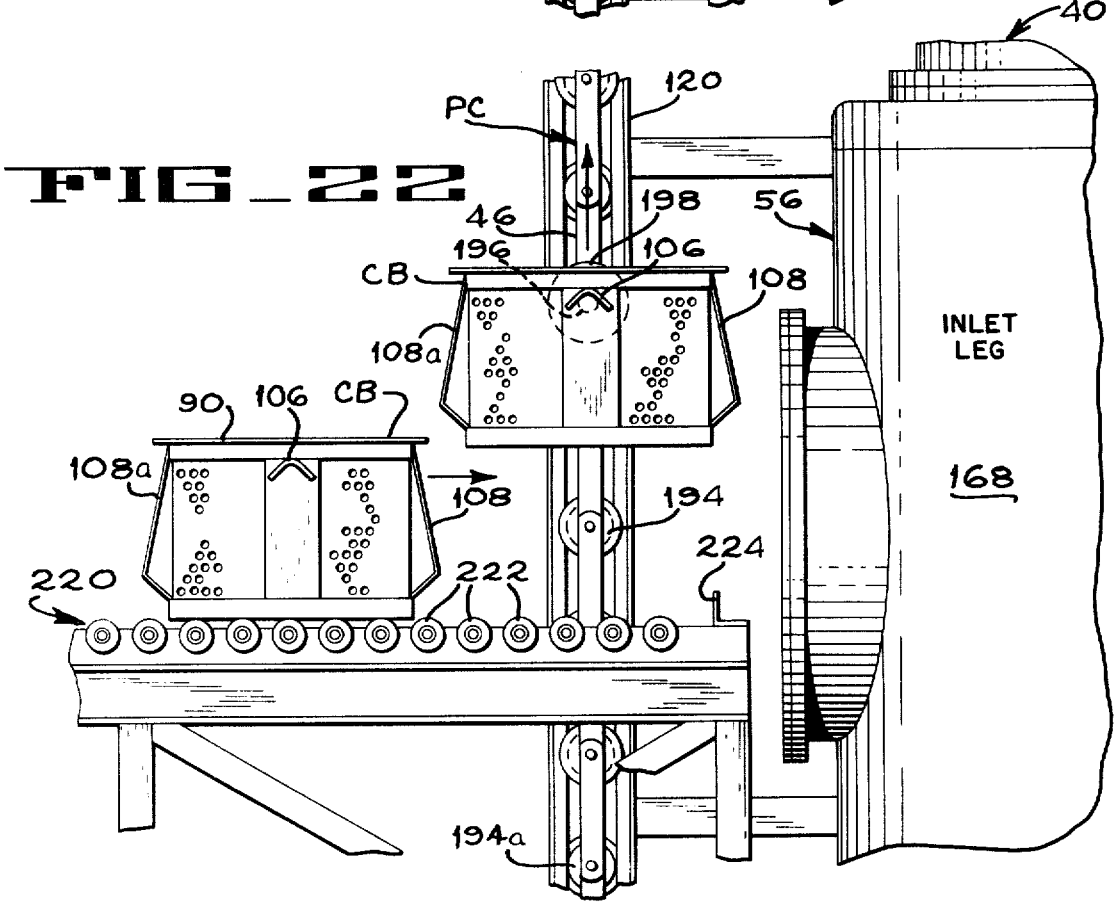

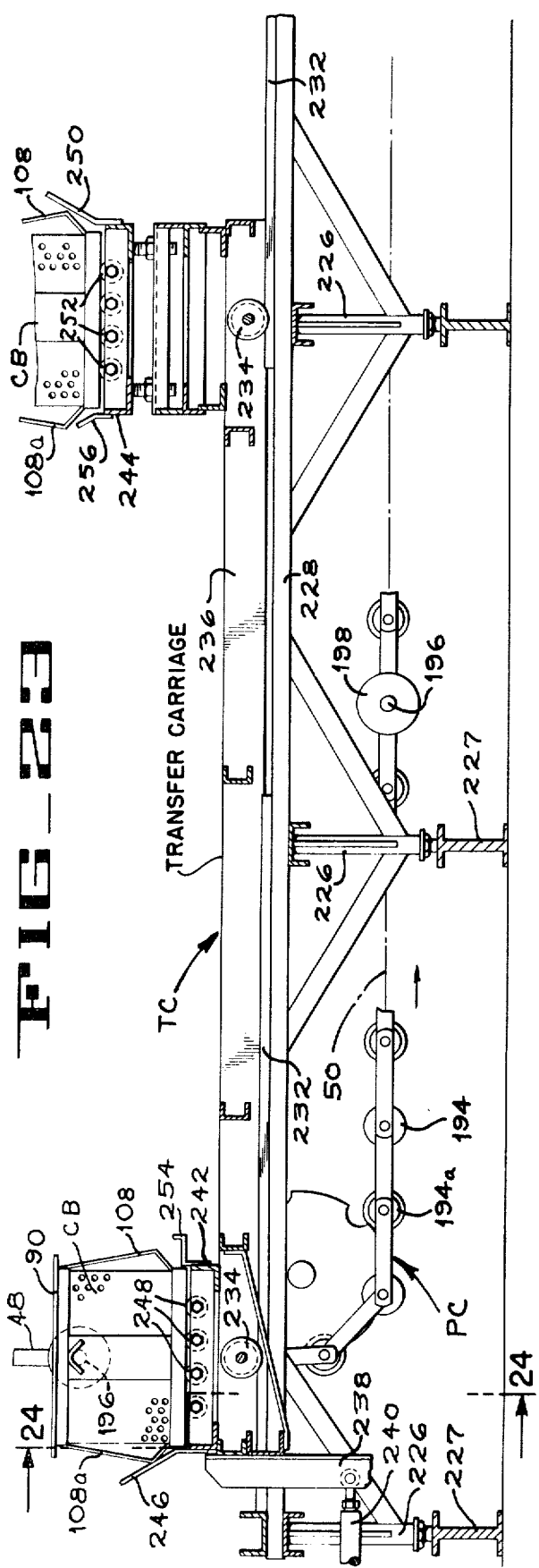
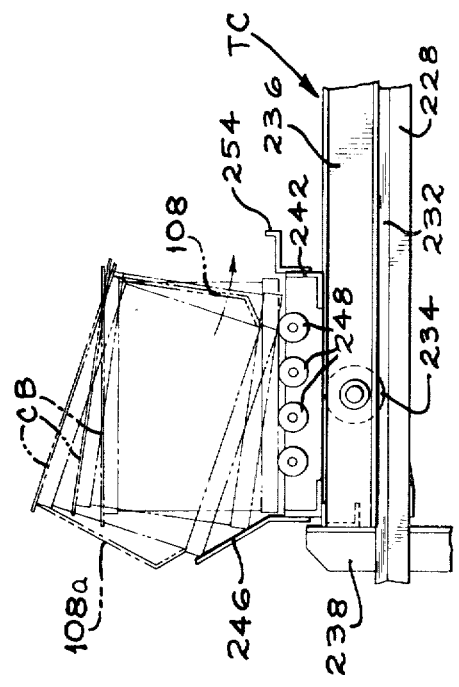
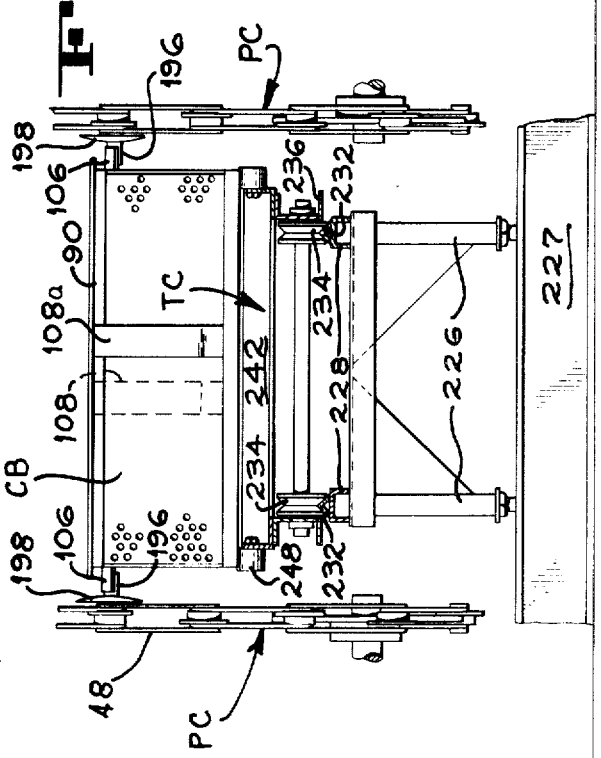

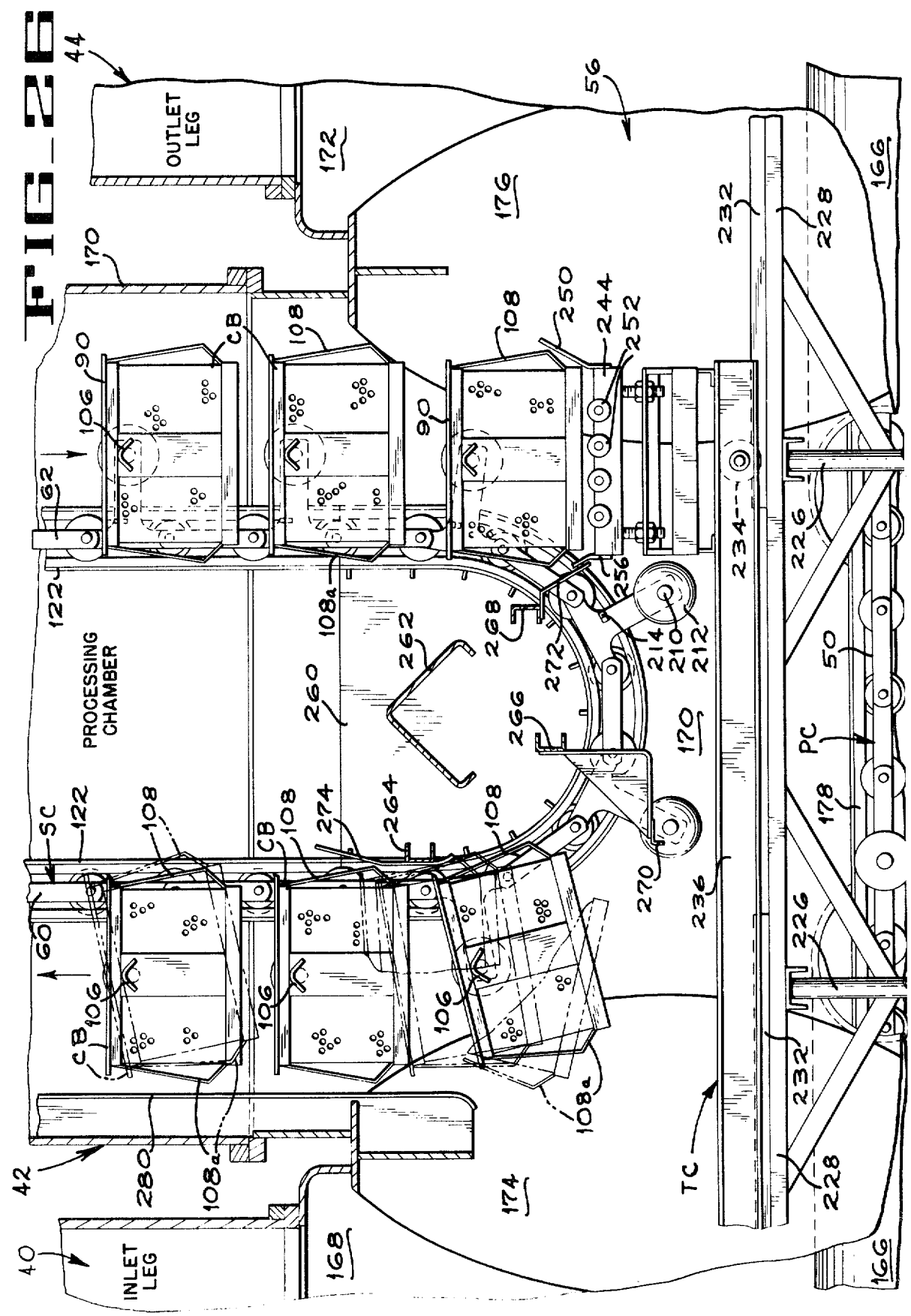

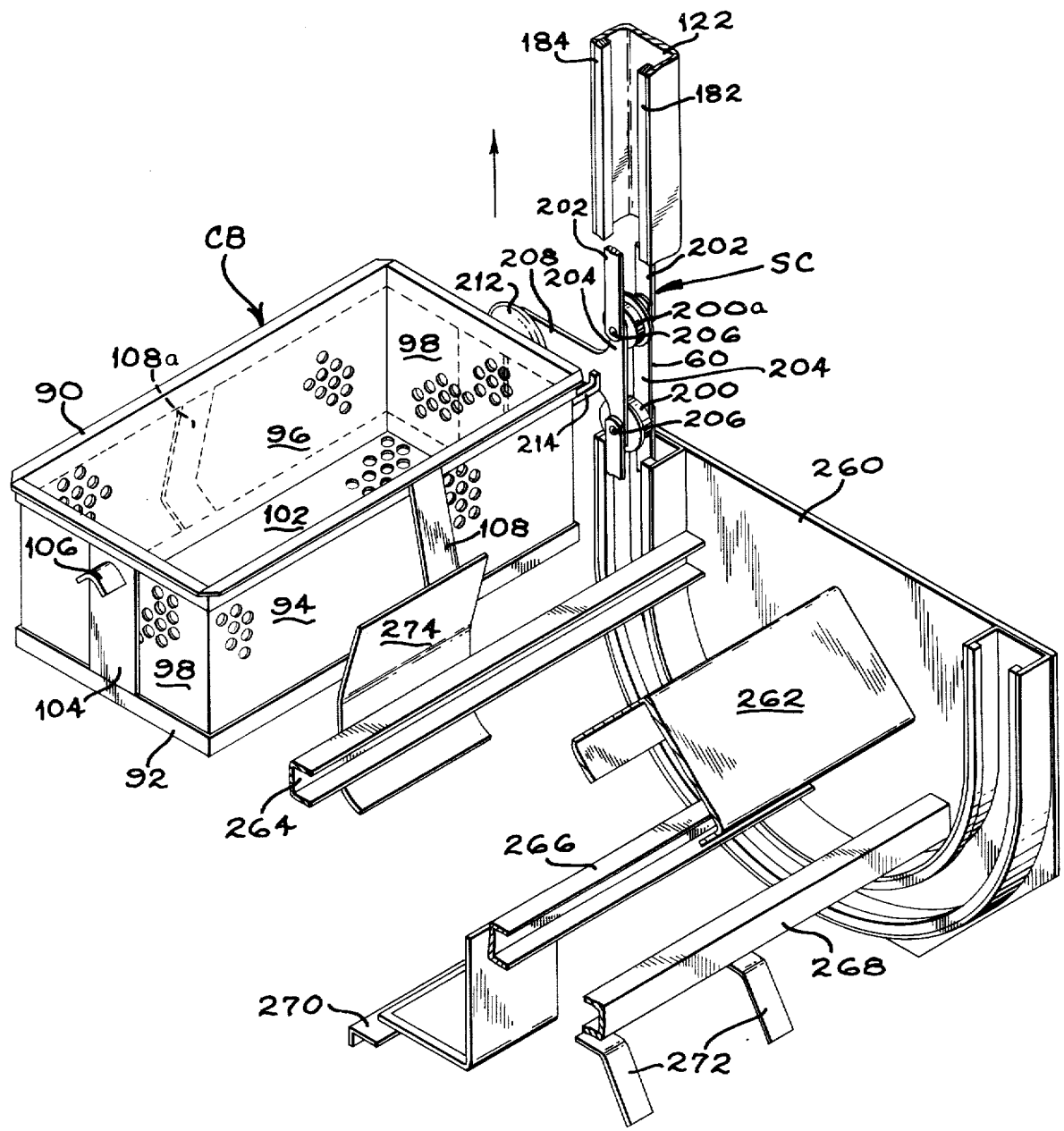
FIG_27

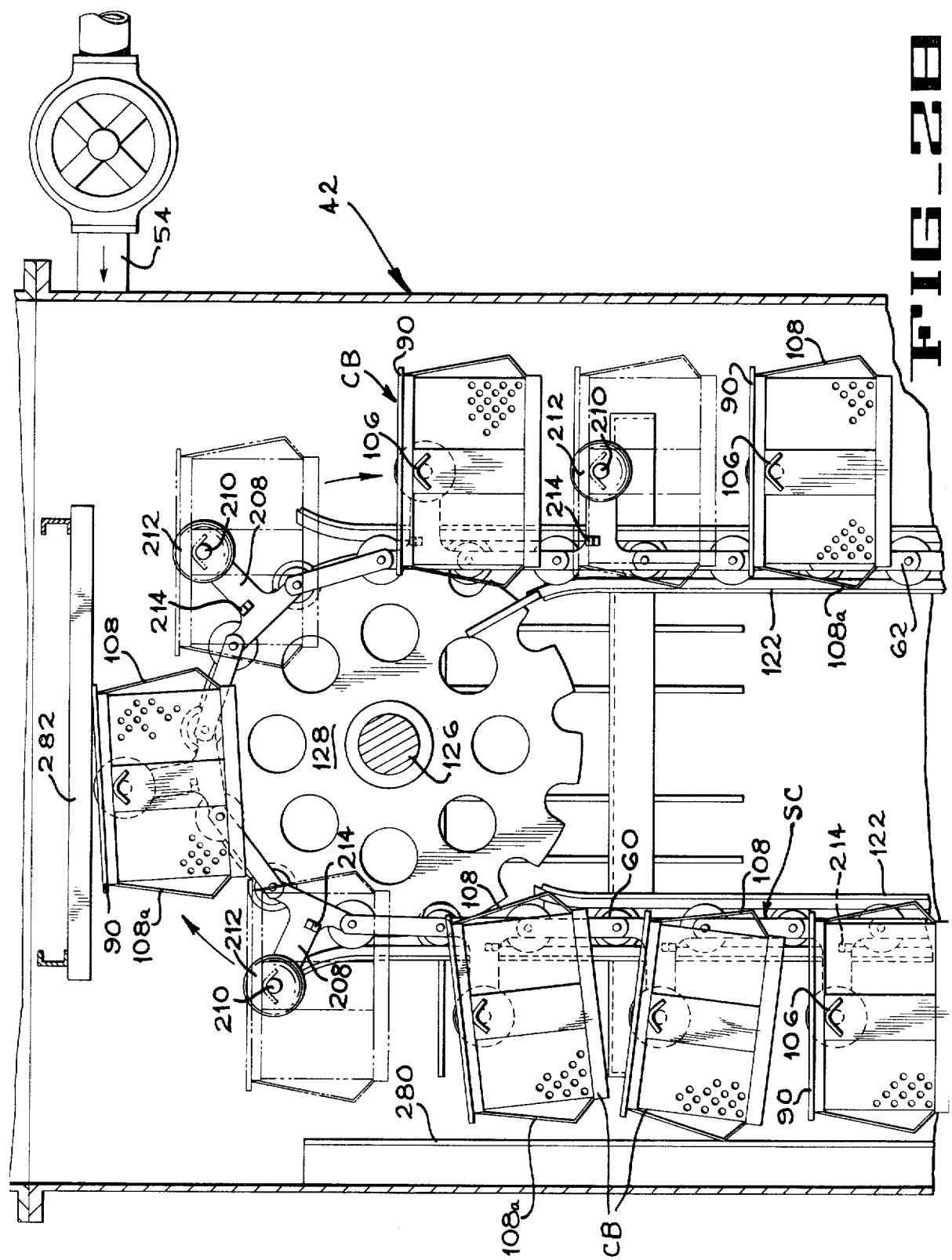

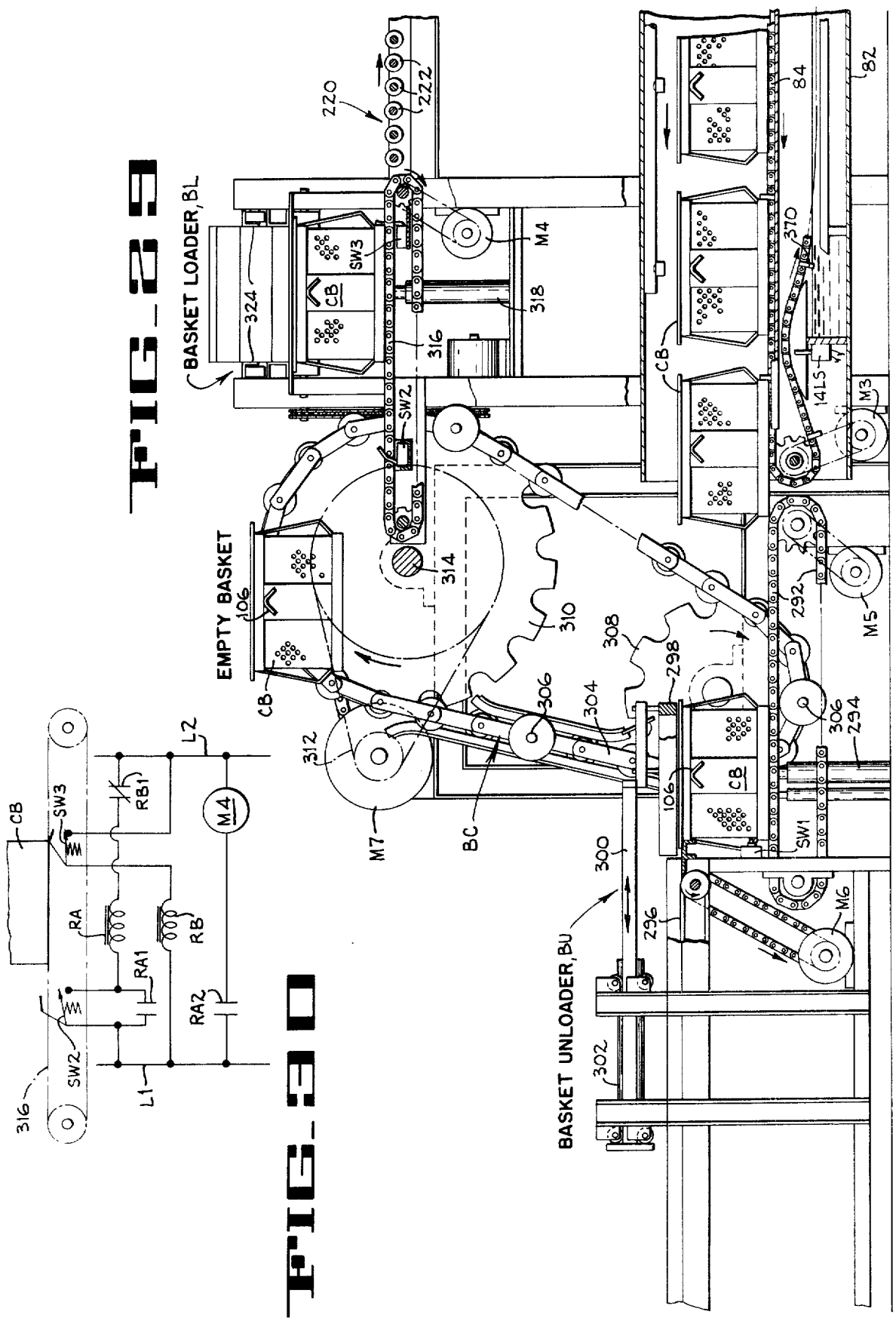

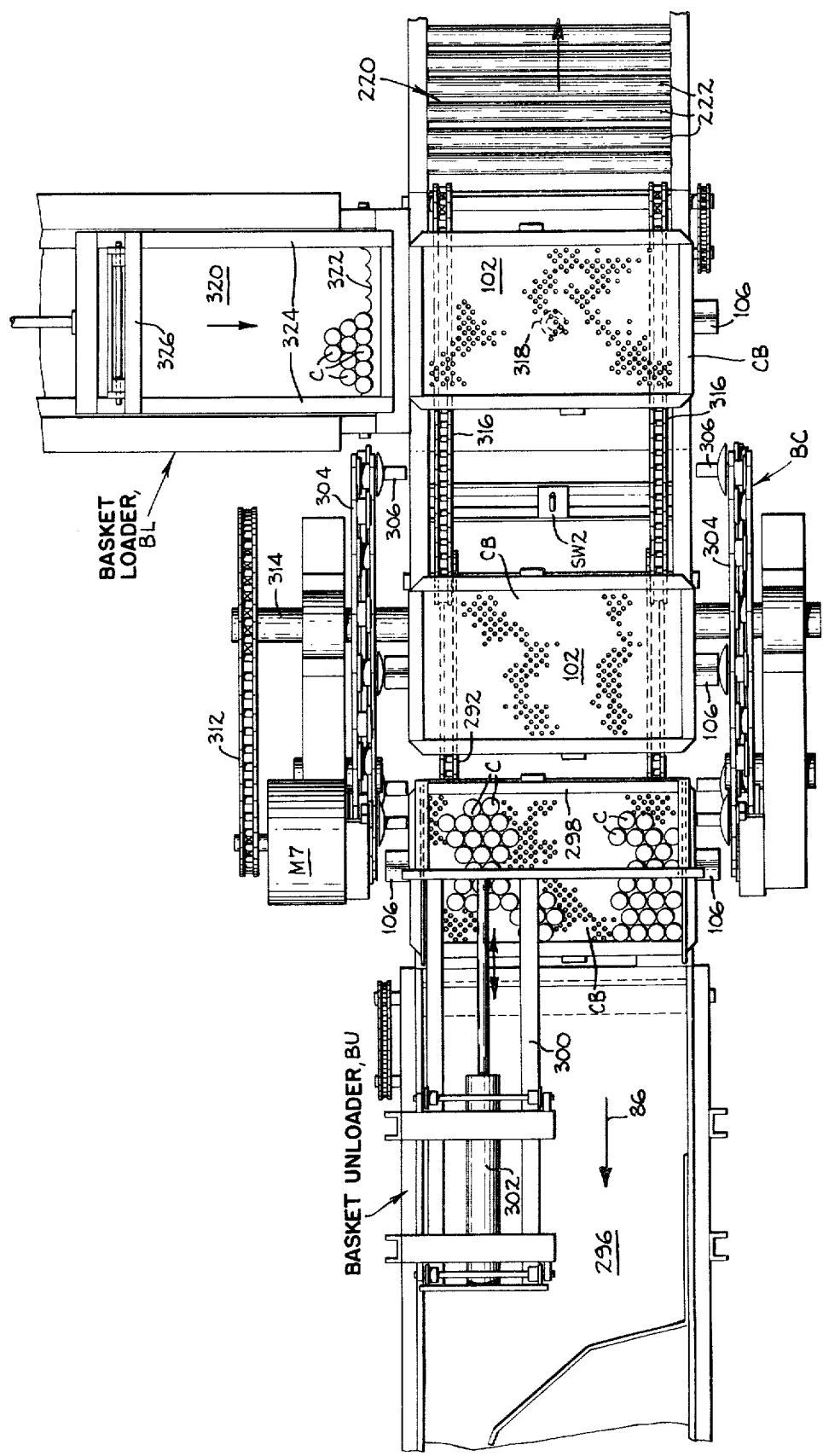

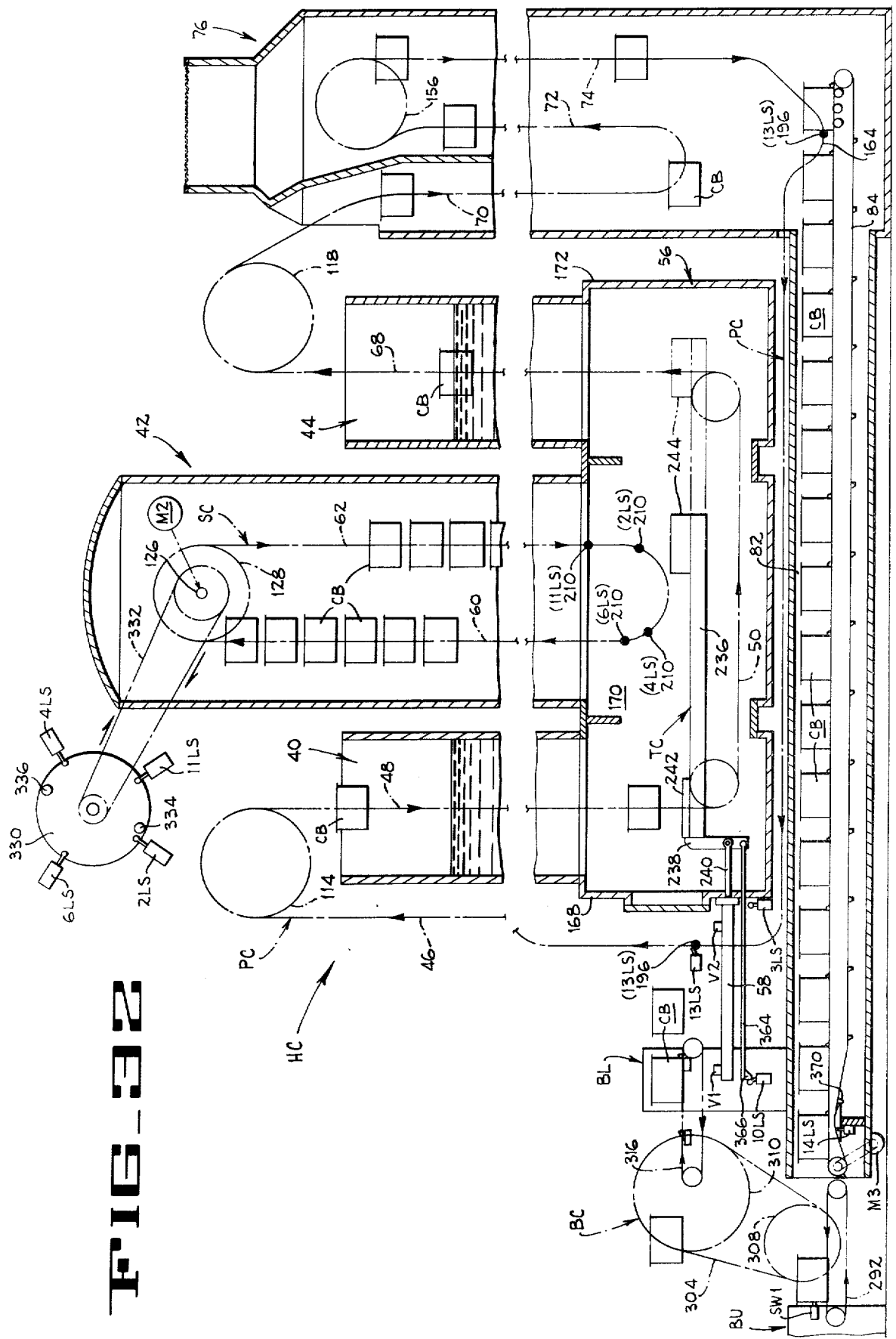

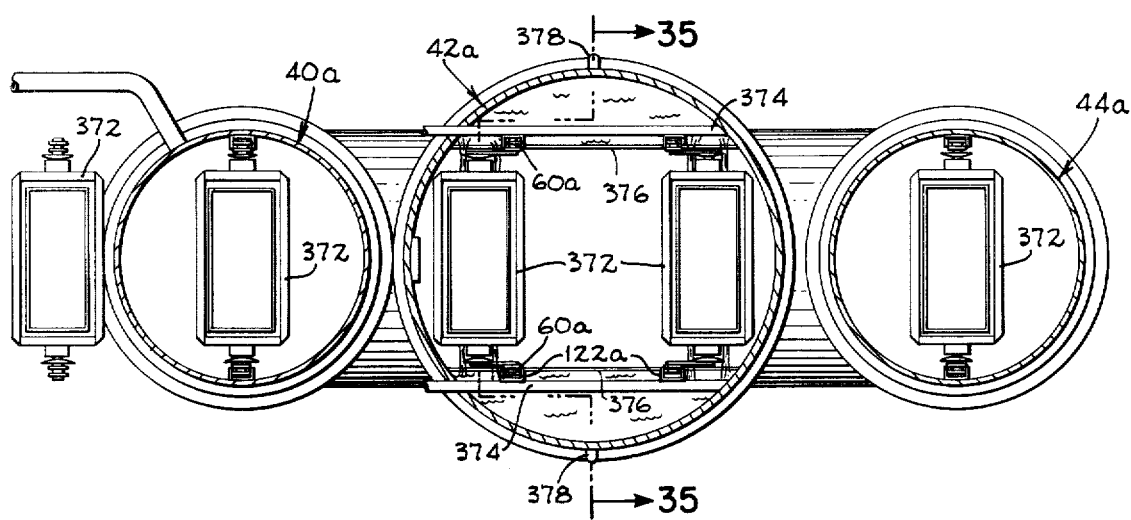
FIG_34
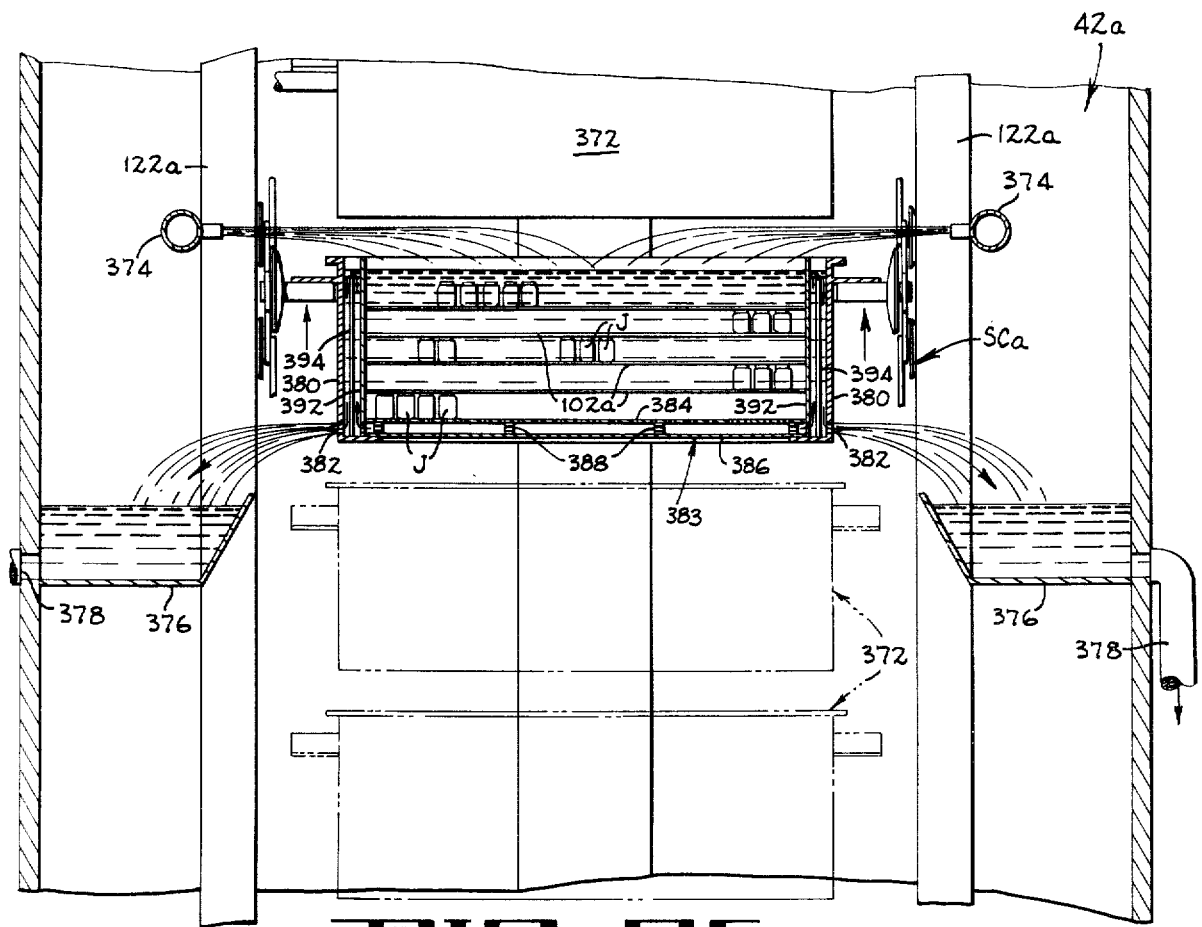
FIG_35

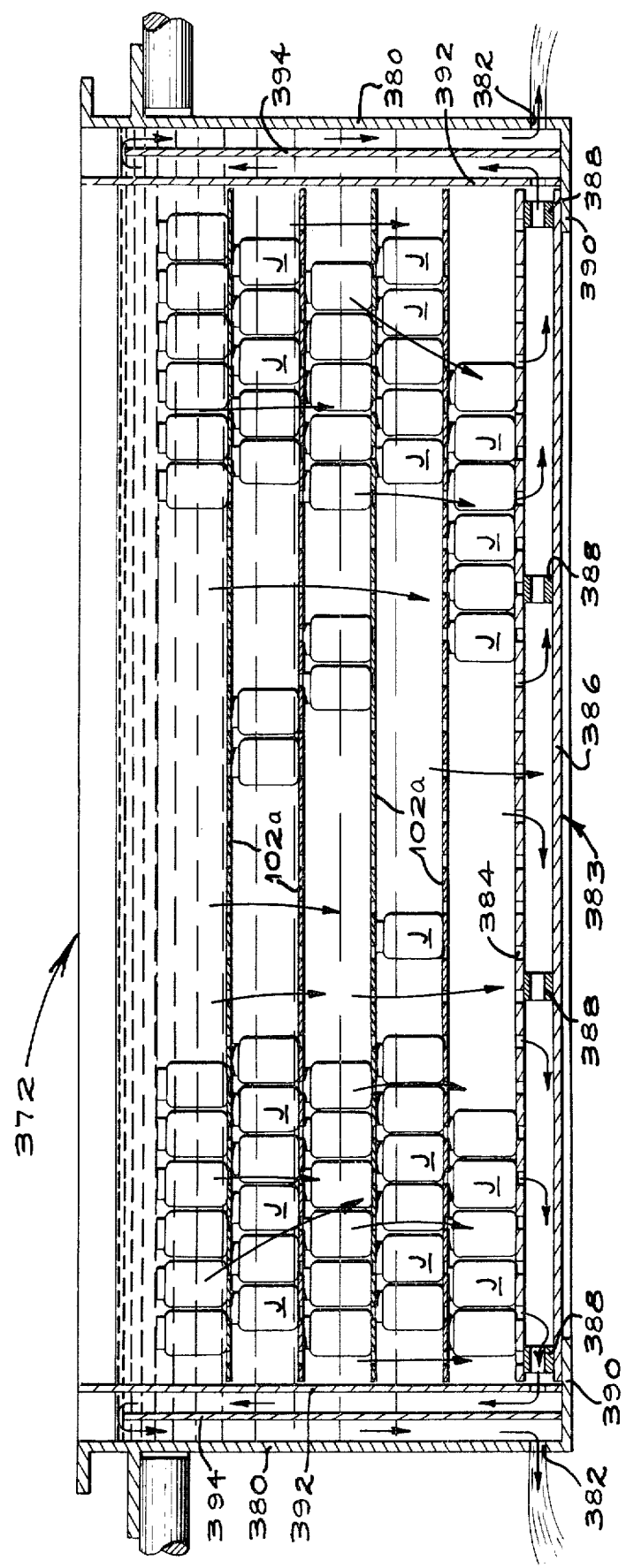

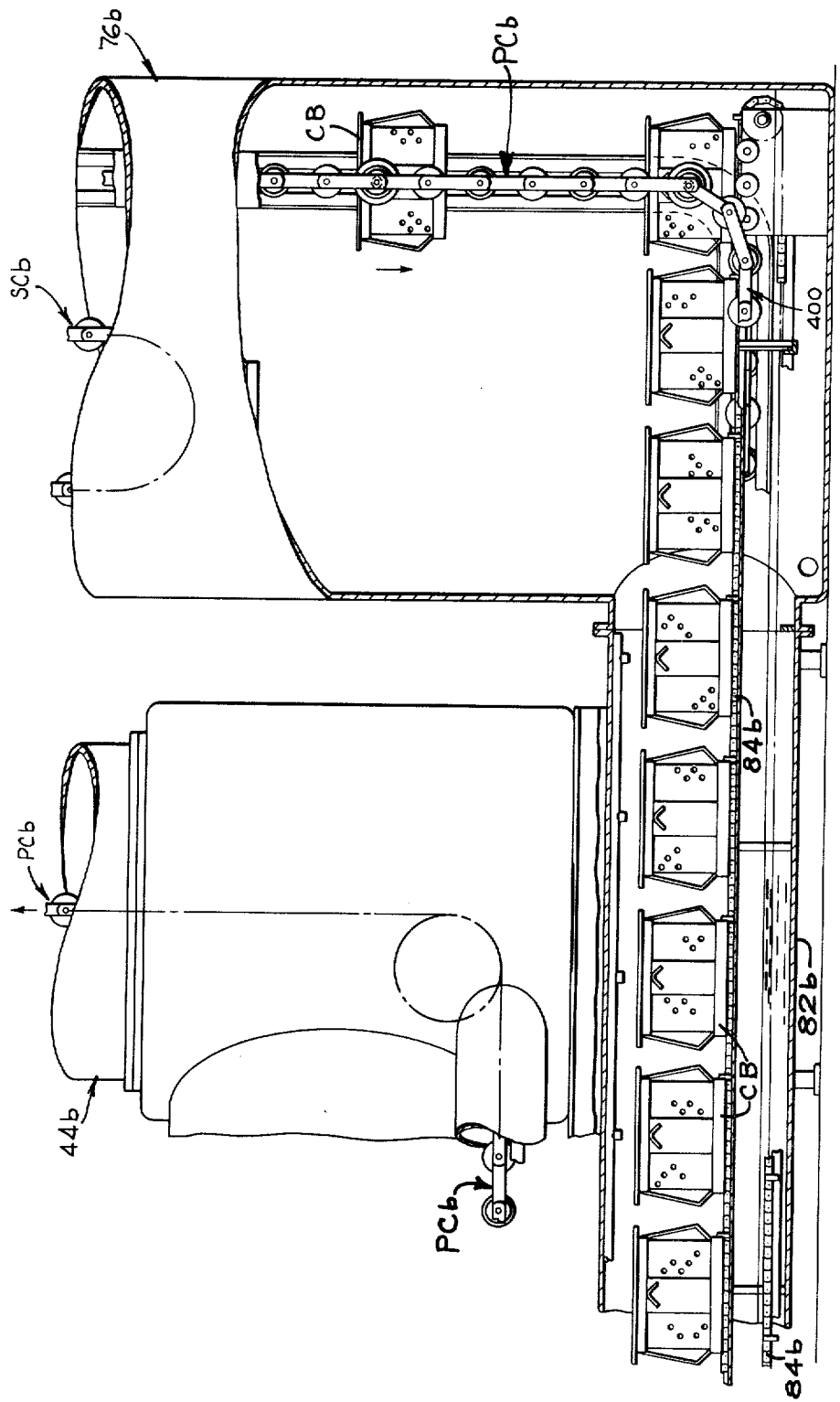

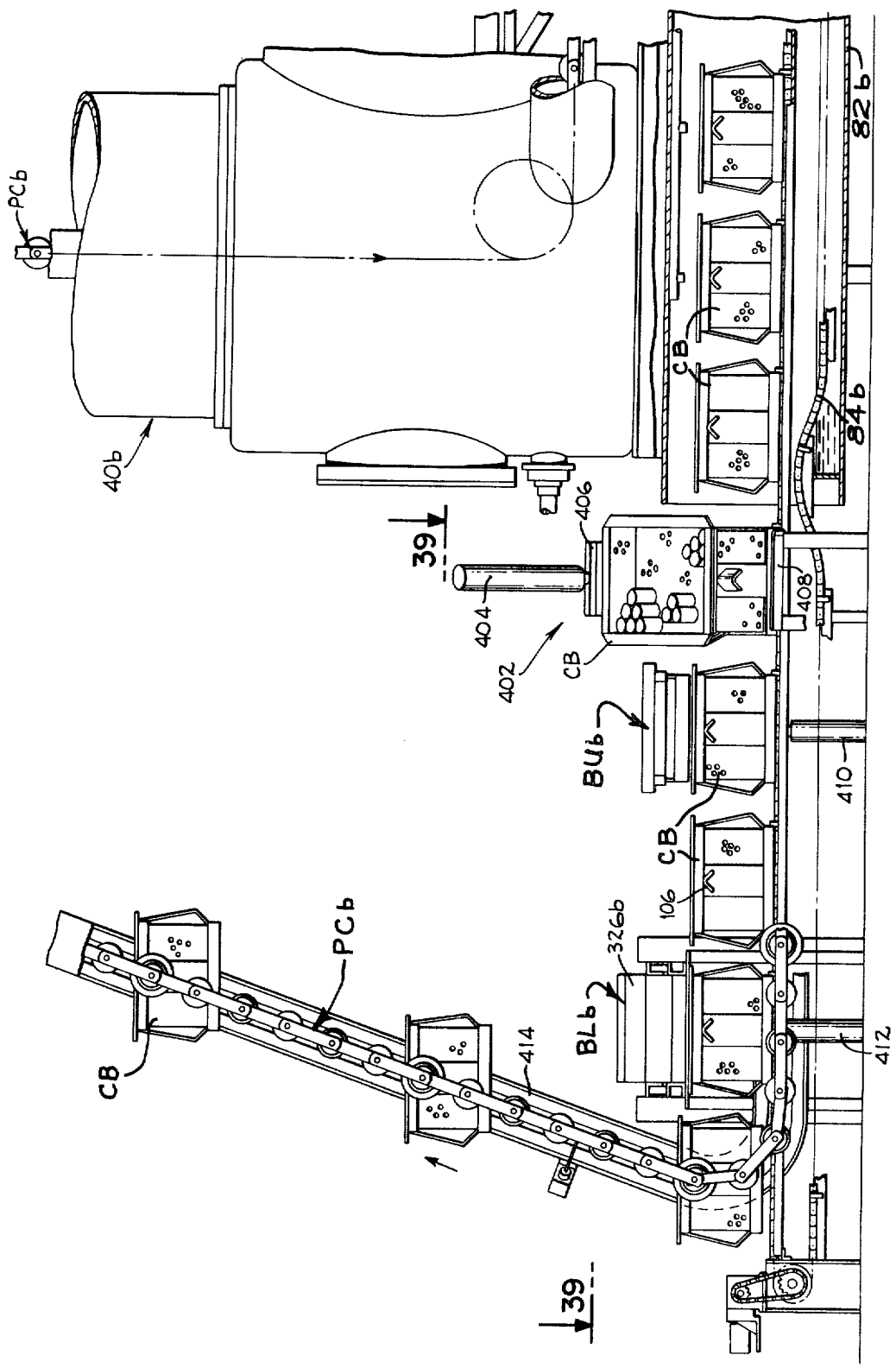

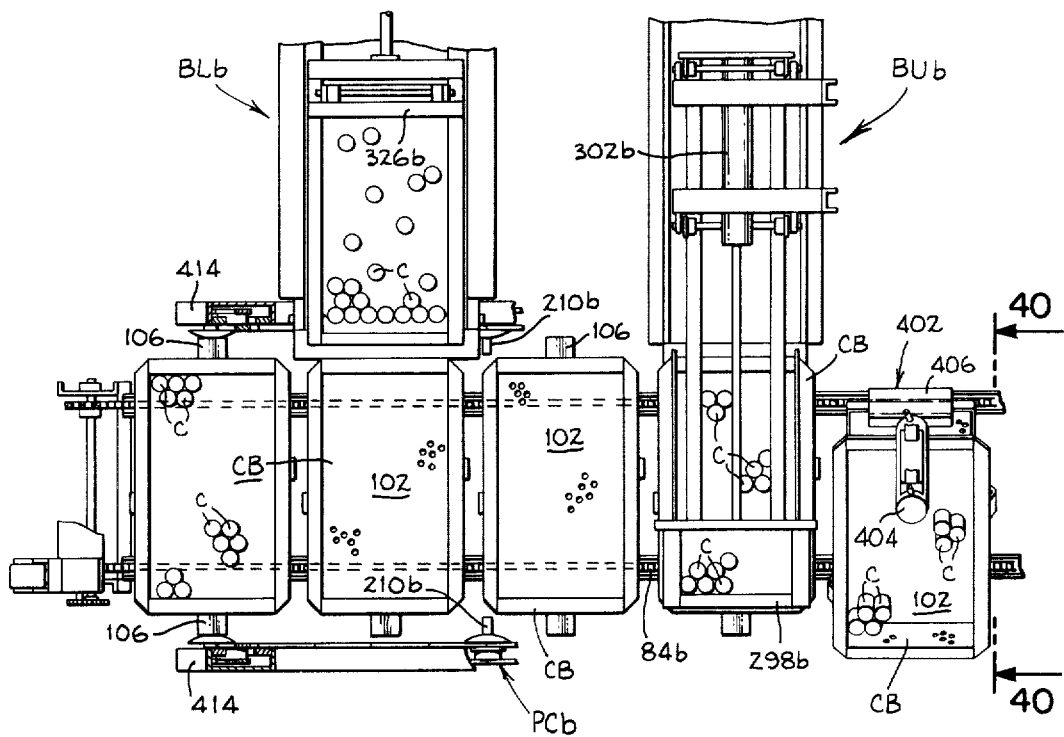
FIG_39
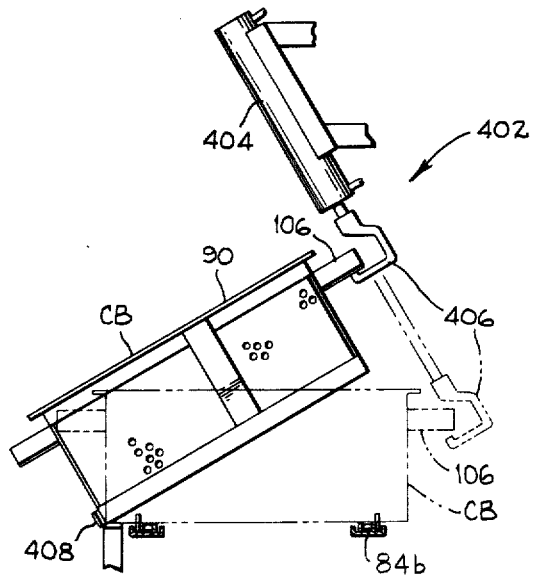
FIG_40

CONTAINERIZED HYDROSTATIC STERILIZING SYSTEM

FIELD OF THE INVENTION

This invention relates to the sterilizing or cooking of products such as food products and more particularly to improvements in the use of hydrostatic sterilization apparatus for this purpose.

DESCRIPTION OF PRIOR ART

The U.S. Pat. No. 3,469,988 to Yawger, Sept. 30, 1969, represents a conventional hydrostatic cooker having inlet and outlet water legs, a steam processing chamber and an endless chain running through the cooker. The containers are loaded in rows or "sticks" into carriers on the chain for processing.

The U.S. Pat. No. 1,584,397 to Paxton, May 11, 1926, shows a similar type of hydrostatic cooker which has an additional water cooling leg at the exit portion of the cooker.

The U.S. Pat. No. 3,478,677 to Mencocci, Nov. 18, 1969, shows a hydrostatic cooker wherein baskets are loaded with containers and the baskets are stacked one upon the other as they are transferred through the water legs and the steam processing chamber. The feed to the inlet waterleg is at the upper end of that leg.

The U.S. Pat. No. 1,419,139 to Hunter, June 13, 1922, discloses a continuous pressure cooker wherein the containers are disposed in baskets permanently connected to a single endless chain running through the cooker with the baskets being equally spaced along the chain.

The U.S. Pat. No. 2,806,423, to Van der Winden, Sept. 17, 1957, shows a conventional type endless chain hydrostatic cooker except that the containers are mounted is equally spaced carriers along the entire length of the processing chain.

The U.S. Pat. No. 1,115,248 to Schier, Oct. 27, 1914, shows a pasteurizing apparatus for bottled milk wherein the bottles are loaded into baskets near the upper end of an endless loading conveyor, conducted down through a hot air chamber and transferred in end-to-end horizontal relationship for being pulled through a horizontal hot water tank.

The baskets are successively transferred by staggered transfer conveyors upwardly through a series of horizontal tanks, the temperatures of which progressively decrease. The uppermost horizontal tank loads baskets onto an endless discharge conveyor from which processed containers in the baskets are unloaded. The baskets are suspended by hangers supported on chain pin extensions (FIG. 3).

The U.S. Pat. Nos. 782,878, Feb. 21, 1905; 798,833, Sept. 5, 1905 to Ruff and 902,826, Nov. 13, 1908, to Loew, show pasteurizing apparatus wherein an endless conveyor pivotally supports uniformly spaced baskets or receptacles, ferris wheel fashion, throughout the processing chambers.

The U.S. Pat. No. 1,980,850 to Clark, Nov. 13, 1934, shows a vehicle storage garage wherein platforms are transferred from the upper end of one row of platforms to the upper end of another row by a horizontal reciprocating transfer carriage.

The U.S. Pat. No. 1,837,605 to Baker, Dec. 22, 1921, shows a processor for bread loaves wherein the loaves are placed in carriers and the carriers are transferred from end-to-end relation on a loading chain to side-by-side relation along a horizontal processing track and back to the loading chain for unloading.

The U.S. Pat. No. 3,078,979 to Block et al., Feb. 26, 1963, shows a comestible treating apparatus wherein support trays are conveyed at uniform spacing through the apparatus by sets of chains and are transferred near the lower reach of the chains by a reciprocating feed transfer and discharge pusher chain.

Other U.S. patents of interest, but less pertinent than those mentioned above are Shaw U.S. Pat. No. 719,890, Feb. 3, 1903; Morton U.S. Pat. No. 1,555,692, Sept. 29, 1925; Morton U.S. Pat. No. 1,564,100, Dec. 1, 1925; Baker U.S. Pat. No. 1,805,029, May 12, 1931; Ellis U.S. Pat. No. 2,268,862, Jan. 6, 1942; Franklin U.S. Pat. No. 3,068,987, Dec. 18, 1962; Howard U.S. Pat. No. 3,349,928, Oct. 31, 1967.

SUMMARY OF THE INVENTION

The object of the present invention is to provide a high volume or high density hydrostatic cooking or sterilizing system, without substantially increasing the cost or complexity of the system as compared with the cost and complexity of prior systems which operate at a much lower volume or product density. A corollary of this object is to provide for the gentle handling of containers, pouches, glass jars or the like going through the system, where no agitation is required, to preclude the possibility of damage and abrasion of these containers during loading, unloading and processing.

The system of the present invention is in the nature of what is known as a hydrostatic cooker, in that it has an upright inlet water leg, an upright processing leg and an upright outlet water leg, the legs being joined at their lower ends by an interconnecting water leg with processing chains passing up and down through the upright legs and transversely through the interconnecting leg.

In accordance with the present invention, the processing chain is divided into a primary chain or chains which pass through the water legs and a secondary chain which passes only through the processing or steam leg. The containers are located in relatively large container structures, such as open baskets, which are detachably suspended on the primary chain. After passing down through the inlet water leg a transfer carriage in the interconnecting water leg transfers the baskets one by one to the upwardly running reach of the secondary chain in the processing chamber. The baskets near the bottom of the down coming reach of the secondary chain are transferred one by one to the up running reach of the primary chain in the outlet water leg. The baskets containing processed containers are returned beneath the cooker to a basket unloading station whereupon the empty baskets are transferred to an adjacent basket loading station for loading with containers and putting the loaded baskets back onto the primary chains.

In the preferred embodiment of the invention, baskets of containers are spaced widely apart (say about ten or eleven feet) on the primary chain or chains and are spaced quite closely together on the secondary chain. These chains are synchronously driven at speeds proportional to the spacings of their baskets so that the same number of baskets of both the primary secondary chains pass a horizontal reference plane over a given period of time. This two speed operation of the chains makes it possible to transfer baskets between the chains without pileup or deficiency of baskets in either chain.

The fact that, in the preferred embodiment of the invention, the primary chains run considerably faster than does the secondary chain has at least two important advantages. One of these advantages lies in the fact that when the containers are filled with a heated product, placed in the baskets and the baskets placed on the primary chain, since the primary chain runs at a relatively rapid linear velocity, the length and time required to transport the heated product up into the inlet water leg of the cooker and down through that leg for transfer to the heated processing chamber is relatively short and therefore the coaveying time to which the heated product is subjected before it reaches the processing chamber is reduced.

Another advantage of the aforesaid construction lies in the fact that a saving in the inventory of the baskets required for the cooker is effected. Since the primary chain or chains run considerably faster than the secondary chain and the baskets are spaced by a proportionately larger distance along the primary chain than along the secondary chain, the number of baskets that are circulating outside the processing chamber itself is considerably smaller than it would be in case the primary chain were run at the same speed as the processing or secondary chain. In this condition, baskets would be as closely spaced along the primary chain, as along the processing or secondary chain, and hence the total inventory of baskets would be greater. Despite the saving in baskets, this construction permits maximum high density utilization of the secondary chain in the processing chamber and thus minimizes the height or volume required for the chamber. The secondary chain can be operated at a velocity slow enough to insure complete sterilization and cooking of the contents of the containers in the baskets. The higher velocities of the primary chain can be independently selected, so long as the basket spacings along the primary chains are increased in accordance with the principles outlined which increase also produces the advantages of quick transfer to the steam leg and basket saving mentioned above.

The processing system of the present invention can be used for the bulk handling of all types of products and of product containers such as pouches, glass bottles or cans and the sizes of the containers need not be uniform.

Other features of the present invention reside in the mode of transfer of baskets from the primary chain to the secondary chain, and from the secondary chain back to the primary chain. Such transfer is effected by a simple reciprocating transfer carriage having two platforms at the proper spacing, and since the baskets are detachably mounted on their respective chains they can be deposited upon and picked up from these platforms without requiring intermittent or indexing motion of either of the primary or secondary chains.

Another feature of the present invention is that due to the efficient utilization of the volume represented by the baskets a large number of containers can be processed in a hydrostatic cooker wherein the water legs and the steam processing chamber leg are of upright, cylindrical construction. This construction, as compared to the conventional square type construction used in conventional hydrostatic cookers, is strong, easily fabricated and is economical in its use of structural materials.

In one embodiment of the invention the baskets can be designed so that the containers in the basket, such as glass jars or the like, can be completely submerged in hot water as they are carried by the secondary chain up and down through the steam filled processing chamber.

Another feature of the present invention is the arrangement of the primary chain so that a basket unloading and loading station can be provided in close proximity and at a lower portion of the cooker, with provisions for a short direct transfer of empty baskets from the unloading station back to the loading station, for the loading of the baskets with containers and introduction of filled baskets back onto the primary chain.

Other features and advantages of the sterilizing system of the present invention will be apparent from the following detailed description of several embodiments of the invention proceeds.

BRIEF DESCRIPTION OF THE DRAWINGS

FIG. 1 is a schematic elevation of the overall hydrostatic cooker of the present invention.

FIGS. 2–5 are enlarged fragmentary schematic elevations of the lower central portion of FIG. 1, and respectively illustrate successive operational positions of a transfer carriage mechanism.

FIG. 6 is an exploded perspective of one of the carrier baskets employed in the hydrostatic cooker.

FIG. 7 is an enlarged fragmentary section of one corner portion of the carrier basket shown in FIG. 6.

FIG. 8 is an enlarged fragmentary elevation of the upper portion of FIG. 1, and particularly details one of the drive mechanisms employed in the cooker.

FIG. 9 is a horizontal section indicated on lines 9—9 on FIG. 8.

FIG. 10 is an enlarged vertical section, partly broken away, of the apparatus shown at the righthand side of FIG. 1.

FIG. 11 is a fragmentary enlarged vertical section of the apparatus shown at the lower portion of FIG. 1.

FIG. 12 is an enlarged vertical section of the upper portion of an inlet water leg shown at the upper lefthand portion of FIG. 1.

FIG. 13 is an enlarged fragmentary section taken along lines 13—13 on FIG. 12.

FIG. 14 is a section taken along lines 14—14 on FIG. 13.

FIG. 15 is an enlarged fragmentary perspective of a section of the chain shown in FIG. 12.

FIG. 16 is a perspective similar to FIG. 15, plus a fragmentary portion of an associated carrier basket.

FIG. 17 is an enlarged horizontal section taken along lines 17—17 on FIG. 11.

FIG. 18 is a vertical section taken along lines 18—18 on FIG. 17.

FIG. 19 is an enlarged section taken along lines 19—19 on FIG. 18.

FIG. 20 is an enlarged horizontal section taken along lines 20—20 on FIG. 18.

FIG. 21 is an enlarged fragmentary elevation of a loading mechanism shown at the lower lefthand portion of FIG. 1.

FIG. 22 is an elevation similar to FIG. 21 but showing a different operational position.

FIG. 23 is an enlarged elevation of a transfer carriage mechanism shown at the lower end of FIG. 11.

FIG. 24 is a vertical section taken along lines 24—24 on FIG. 23.

FIG. 25 is a side elevation of the apparatus shown in FIG. 24, with the carrier basket shown in multiple phantom line positions.

FIG. 26 is an enlarged vertical fragmentary section of the lower central portion of FIG. 11.

FIG. 27 is an enlarged fragmentary perspective illustrating a part of the apparatus shown in FIG. 26.

FIG. 28 is a fragmentary section illustrating the upper end portion of the apparatus shown in FIG. 26.

FIG. 29 is an enlarged elevation, partly in section, of the loading and unloading apparatus shown in the lower left corner of FIG. 1.

FIG. 30 is a schematic electrical diagram associated with a conveyor shown in FIG. 28.

FIG. 31 is a plan of the apparatus shown in FIG. 28.

FIG. 32 is a diagrammatic elevation similar to FIG. 1 but incorporating electrical control switches.

FIG. 34 is a horizontal section similar to FIG. 9, of an apparatus especially adapted to handle glass containers.

FIG. 35 is an enlarged vertical section taken along lines 35—35 on FIG. 34.

FIG. 36 is an enlarged vertical section of the carrier basket shown in FIG. 35.

FIG. 37 is an elevation partly broken away of a second embodiment of the invention, and is similar to the apparatus shown in FIG. 11.

FIG. 38 is an elevation of the opposite lateral end of the apparatus shown in FIG. 37, and corresponds generally to the same area of the cooker that is shown in FIG. 29.

FIG. 39 is a plan of the area indicated by the arrows 39—39 on FIG. 38.

FIG. 40 is an elevation, showing a different operational position, indicated by the arrows 40—40 on FIG. 39.

DESCRIPTION OF THE PREFERRED EMBODIMENTS

General Organization

Figure 33:
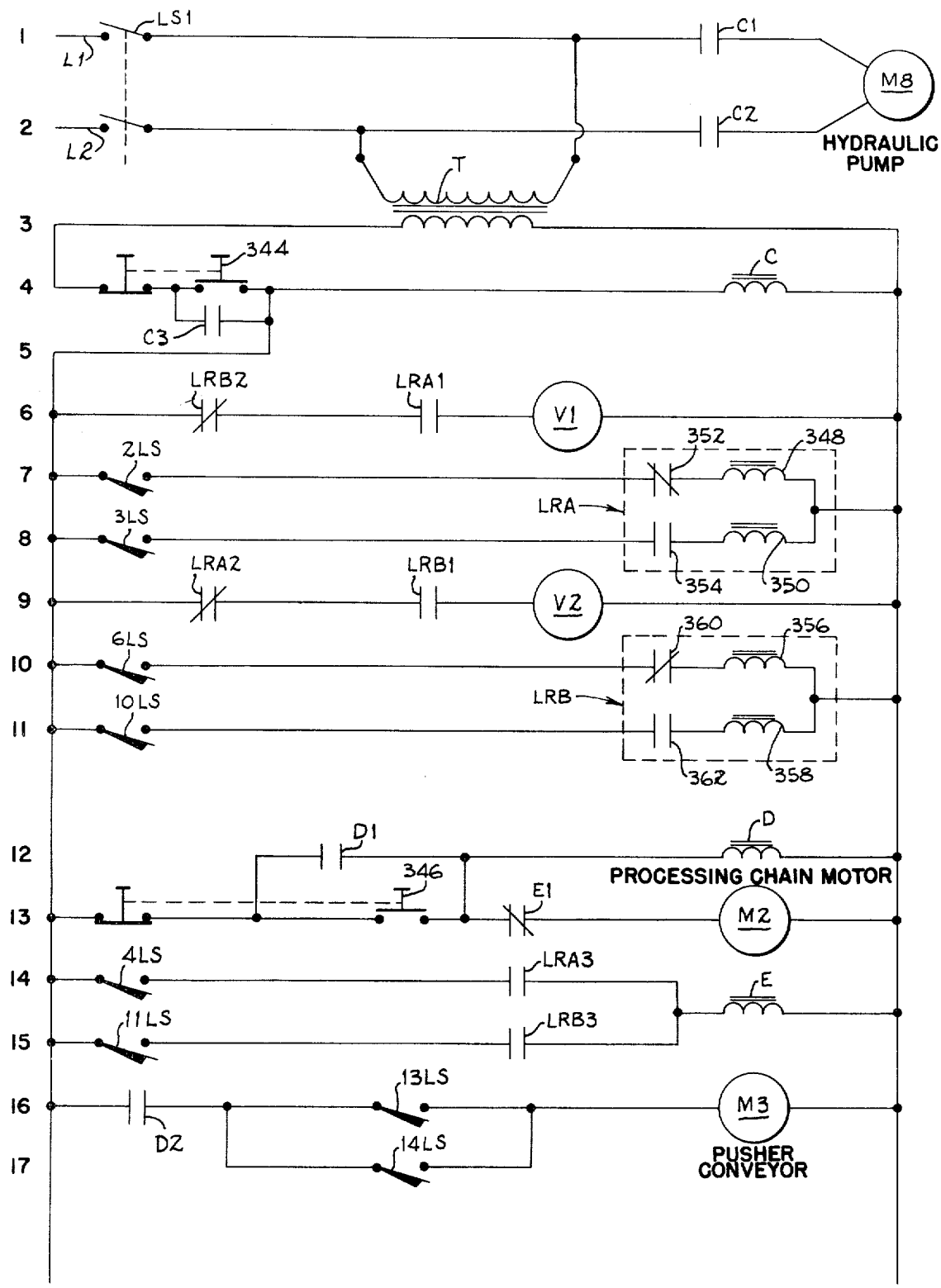
FIG. 33 is a schematic electrical diagram of an automatic control system.

With reference to FIG. 1, the overall hydrostatic cooker HC includes an inlet water leg 40, a steam processing leg or chamber 42, and an outlet water leg 44. Filled containers, such as glass jars or cans, are automatically assembed into carrier baskets CB by a basket loader BL at the inlet zone of the cooker. Each basket, containing as many as several hundred containers, depending upon their size, proceeds from the basket loader onto two parallel ascending reaches 46 of an endless primary carrier chain PC. Two parallel descending reaches 48 of the same chain PC extend downward through the inlet water leg 40, and extend with horizontal reaches 50 through a chamber 56 that interconnects the legs 40, 42 and 44 and under a horizontally reciprocable transfer carriage assembly TC.

A cooking medium, such as steam, or steam and air, is supplied to the upper end of the steam processing leg 42 through a conduit 54 to pressurize and heat the leg, which depresses the intermediate water level L toward the lower end of the processing leg 42. A hydraulic cylinder 58 mounted on the outside of the shell 56 reciprocates the transfer carriage assembly TC to transfer baskets CB to and from an endless secondary chain SC, comprising two parallel ascending reaches 60, and two parallel descending reaches 62.

It will be noted that the carrier baskets CB on the primary carrier chain PC are spaced farther apart than are the baskets on the secondary carrier chain SC. This is an important feature of the present invention, in that it minimizes the overall number of carrier baskets necessary to keep a continuous closely spaced series of carrier baskets in transit through the steam processing leg 42. In an operative structural embodiment of this feature, the baskets CB on the primary chain means PC are spaced eleven (11) feet apart, whereas the baskets on the secondary chain means SC are only two (2) feet apart. Thus, the primary chain PC must travel 550 per cent faster than the secondary chain SC, and this velocity ratio is maintained for all (variable) processing times by utilizing a common power source and predetermined drive ratios to each of the chain means. Stated differently, the number of baskets on the primary chain that passes a horizontal reference in a given period of time equals the number of baskets on the secondary chain that passes the reference plane in the same period of time.

In order to transfer the carrier baskets CB (FIGS. 1–5) among the various reaches of the primary and secondary conveyor chains, two carrier baskets CB are deposited upon the transfer carriage TC from chain reaches 48 and 62 while the carriage is in a retracted position, and the carriage is then advanced to place the same two containers in position to be picked up from the transfer carriage by chain reaches 60 and 68. Thus, as shown in FIG. 2, the transfer carriage TC is retracted and a carrier basket A is about to be deposited on the transfer carriage TC from the primary chain reach 48 in the inlet water leg at about the same time a carrier basket C, the contents of which have been processed in the processing chamber 42, is being deposited on the carriage from the secondary chain reach 62. The carrier baskets B and D are respectively being raised and lowered by the secondary conveyor SC.

In FIG. 3, the transfer carriage TC is shown in an intermediate position advancing to place the carrier basket A in position for pickup by the reach 60 of the secondary conveyor SC, and to place the carrier basket C in position for pickup by a reach 68 of the primary conveyor PC.

FIG. 4 shows the transfer carriage TC at its forwardmost position, wherein the basket A is ready for pick up by the chain reach 60 and the basket C has just been picked up by the chain reach 68. Carrier baskets B and D are respectively rising and lowering.

After the carrier baskets A and C have been picked up, as shown in FIG. 5, the transfer carriage TC is fully retracted and the descending carrier basket D from the processing chamber, and an incoming carrier basket E, from the inlet water leg are about to be deposited on the carriage, as described in connection with FIG. 2.

Returning now to FIG. 1, beyond the outlet water leg 44, the primary chain PC is provided with three pairs of reaches 70, 72 and 74 which traverse the interior of a cooling chamber 76 having an air blast generating fan 78 and water spray manifolds 80 for cooling the baskets and their container loads. At the bottom, the cooling chamber 76 merges with a lateral conduit comprising a cooling tunnel 82 which encloses a pusher or basket return conveyor 84 that receives water from pipes 85 (FIGS. 37 and 38). The carrier baskets CB from the descending chain reaches 74 are deposited upon the conveyor 84 and moved to a basket unloader BU which removes the cooked containers from the carrier baskets and discharges the containers to the left as viewed in FIG. 1 for further handling by other apparatus. The empty carrier baskets are picked up by a basket conveyor BC for delivery to the basket loader BL and a repetition of the handling procedures described.

The ensuing description is directed to structural details, operational features, and the cooperative relation of the various components as set forth in the foregoing brief outline.

Carrier Basket Construction

Each carrier basket CB (FIGS. 6 and 7) includes upper and lower rectangular angle iron frames 90 and 92, secured to perforate front and rear walls 94 and 96, and two perforate side or end walls 98. The bottom frame 92 is provided with an inturned flange 100 arranged to support the lowermost one of several perforate divider plates 102 that separate the layers of containers C. As later described, this construction allows the charge of containers to be vertically inserted or removed from the carrier basket for the basket loading and unloading operations.

To detachably suspend the carrier basket from the primary and secondary carrier chains PC and SC, a reinforcement plate 104 is secured to the frames 90 and 92 across each end wall 98, and is provided with a laterally projecting, downwardly open hanger 106. The hangers lie on the centerline of the carrier basket and the baskets are arranged to be pendantly supported by the hangers 106 and later described chain attachment pins. Guide brackets 108, 108a extend across each of the walls 94 and 96 between the upper and lower frames 90 and 92 for stabilizing and guiding the carrier basket in a manner later described.

Processing Chamber Construction

As shown in FIGS. 8 and 9, the inlet water leg 40, the steam processing leg 42 and the outlet water leg 44 are of cylindrical form, as are the later described parts of the horizontal shell 56 which interconnects the legs 40, 42 and 44. A fabricated superstructure 110 atop the inlet water leg 40 supports a rotatable driven shaft 112 carrying two sprockets 114 which drive the ascending reaches 46 (FIG. 1) of the primary chain PC. Similarly, a fabricated superstructure 116 atop the outlet water leg 44 supports a driven shaft 117 carrying sprockets 118 that drive the ascending reaches 68 of the primary chain PC through the outlet water leg 44. Vertical chain guides 120 (see also FIGS. 11 and 12, for example) are supported by the superstructure 110 for guiding the chain reaches 46 and 48. Similar chain guides 122 (FIGS. 9, 11 and 27) are mounted inside the steam processing leg 42 on inwardly projecting ledges 124 for guiding the reaches of the secondary chain SC. A chain guide arrangement 125 (FIG. 10) similar to that provided for the reach 48 of the primary chain PC is provided within the outlet water leg 44 for the reaches 68 of the primary chain PC.

Chain Drives

With continued reference to FIGS. 8 and 9, a main drive shaft 126 extends through the upper end carries of the steam processing leg 42 and carrier sprockets 128 (see also FIG. 29) over which are trained the secondary chains SC. As previously indicated, the primary and secondary chains PC and SC, respectively, share a common drive source. For this purpose, the steam processing leg 42 is provided with a laterally projecting platform 130 supporting a speed-controlled motor M2 which is coupled to a gear box 132. Unit 133 is a remote control unit to govern the speed of motor M2. The output shaft of the gear box 132 is connected to a chain and sprocket drive unit 134 that powers a jackshaft 136 (FIG. 8). For driving the secondary chain SC at the proper velocity, the jackshaft 136 powers two chain and sprocket drive chains 138 and 140, the latter of which is coupled to a projection of the main drive shaft 126. As shown in FIG. 8, the chains 138, 140 operate through a countershaft 139, which provides a step down drive from the jackshaft 136 to the processing chain shaft 126. The jackshaft 136 also powers the driven shaft 112 for the primary chain sprockets 114 via chain and sprocket drive train units 142 and 144 and an intermediate jackshaft 145, and powers the driven shaft 116 for the primary chain sprockets 118 by means of chain and sprocket drive train units 146 and 148. A jackshaft 150 intermediate the latter two drive train units powers a chain 152, shown in phantom lines in FIG. 10, for driving the primary chain reaches 70, 72 and 74 within the cooling chamber 76, as later mentioned.

As seen in FIG. 10, from the sprockets 118 atop the outlet leg 44, the two runs of the primary chain PC each descend toward the cooling chamber 76 through chain guides 154 which follow the chain reaches 70 and 72 within the cooling chamber. At the upper end of the cooling chamber, the two primary chains are trained around sprockets 156 (only one of which is shown) that are mounted on a shaft 158 driven by a chain and sprocket drive train 160 which is coupled to the previously mentioned drive chain 152 through a countershaft. The final descending reaches 74 of the primary chain PC in the cooling chamber 76 extend downward through chain guides 162 (only one of which is shown) having lowermost portions at 164 which dip close to the conveying surface of the return or pusher conveyor 84. The chain guides 162 then extend upwardly and horizontally at 165 (FIGS. 10 and 11) under the shell 56 back to the ascending reaches 46 of the primary chain PC at the inlet end of the machine.

Those horizontal reaches 50 of the primary chains PC which extend horizontally through the shell 56 from the inlet leg 40 to the outlet 44 (FIGS. 10 and 11) run through four short external tubes 166 that are welded to base tanks for the legs 40, 42 and 44 and which preserve the watertight integrity of the interconnecting shell 56. Thus, the interconnecting shell 56 includes three upright cylindrical tanks 168, 170 and 172, which respectively support the inlet water leg 40, the steam processing leg 42, and the outlet water leg 44. Short, horizontally disposed large diameter cylindrical conduits 174 and 176 connect the central tank 170 with the adjacent tanks 168 and 172. The reach 50 of the primary chain PC, and its associated chain guides 178 (FIG. 11) extend through the four conduits 166 exteriorly of the tanks 168, 170 and 172, the conduits being in sealed relation with the three tanks, as mentioned above.

Primary Chain and Chain Guide Construction

With reference to FIGS. 12-14, each of the previously mentioned guides for the primary chain PC are typically represented by the chain guide 120. The chain guide 120 comprises a U-shaped channel 180 (FIG. 14) with various straight and curved runs conforming to the desired path of the primary chain PC, and having confronting track portions 182 and 184 secured to the parallel legs of the channel. As shown in FIG. 12, at appropriate places along the run of the chain guide 120, the sidewalls of the channel are diverted outwardly, as are the tracks 182 and 184 to provide flared entrance and exit throats. Where the channel member 180 lies close to the inner wall of a processing leg, as in the case of the chain guide 120 within the inlet water leg 40 (FIG. 12), the channel is secured to an arcuate spacer member 186 (FIG. 14) which is bolted to the leg wall. The primary chain PC is provided with inner and outer pairs of links 190 and 192 (FIG. 13) with a large diameter flanged roller 194 at the pivot sleeves 195 which interconnect the links. The flanges of vertically adjacent rollers 194a lie on opposite sides of the chain tracks 182 and 184 to limit lateral motion of the chain.

At each point along the primary chain PC where a carrier basket CB is to be temporarily attached to the chain for conveyance through the cooker, the chain pivot comprises an elongate, inwardly projecting pin 196 having a shank 197 that is secured within a pivot sleeve 195. The pins 196 are arranged to ascend beneath the carrier basket hangers 106 and thereby suspend the carrier basket from the primary chain. A large saucer-shaped washer 198 is welded to each pin 196 to provide an arcuate inner face for camming the carrier basket to a central position between the two opposed pins 196 if the carrier basket is slightly displaced laterally from its normal pickup position.

Secondary Chain and Basket Support Construction

Construction of the secondary conveyor chain SC, which travels in a closed loop through the steam processing leg 42 (FIG. 1) is best shown in FIGS. 15 and 16. As in the case of the primary conveyor chain PC, the secondary conveyor chain SC includes flanged rollers 200, 200a, adjacent rollers being oppositely oriented to prevent lateral drift of the chain as it is guided by the tracks 182 and 184 in the channel 122 (FIG. 20). The outer links 202 and the inner links 204 are pivotally interconnected by pins 206 passing through the links and rollers. One of the links 204 is T-shaped, to provide a base leg or arm 208 extending normal to the general plane of the chain. Welded to the end portion of the arm 208 is an inwardly projecting carrier basket support pin 210, extending through and mounting a saucer-shaped washer 212 which functions to generally center the basket in the same manner as the washer 198 previously described in connection with FIGS. 13 and 14.

Inwardly of the support pin 210 a stop arm 214 is secured to the link 204 in position to underlie the outwardly directed flange of the upper channel 90 of the basket CB (FIG. 16). The purpose of the stop bar 214 is to limit swinging movement of the carrier basket CB about the pins 210 to an angle of 7° (FIG. 16) and hence beyond a point which would allow the basket to contact the adjacent wall of the steam processing leg 42, as shown in phantom in FIG. 18. Opposite the stop arm 214 (FIGS. 15 and 16) a laterally directed arm 216 is welded to the base leg 208 and has a distal end in contact with the chain link 204 to stabilize the perpendicular relation of the base leg 208 with the general plane of the chain. FIGS. 19 and 20 further illustrate the spatial relation of the parts above described.

Loaded Basket Pickup

The basket loader BL (FIG. 1) which is later described in greater detail, includes a discharge conveyor 220 (FIGS. 21 and 22) having a terminal end disposed between the two ascending reaches 46 of the primary chain PC. The conveying surface of the conveyor 220 is formed by rollers 222 which support the loaded carrier baskets CB and bring the leading basket against a stop 224 (FIG. 21). In this position, the hanger brackets 106 of the leading carrier basket are aligned with the carrier basket support pins 196. Thus, the carrier basket is positioned by the conveyor 220 for pickup by the two pins 196 before these support pins 196 reach the leading basket and traverse the ascending reaches 46 of the primary conveyor chain PC. The pins subsequently engage and lift the leading carrier basket, as shown in FIG. 22, whereupon the next incoming carrier basket is positioned against the stop 224 by the conveyor 220.

Transfer Carriage Construction

With reference to FIGS. 23–26, pedestals 226 and associated reinforcement brackets and cross pieces have I beam bases 227 and support two laterally spaced inverted U-shaped channels 228 which are mounted in the tanks 168, 170 and 172. An inverted V-shaped track 232 is mounted on the upper surface of each channel 228 and is engaged with rollers 234 on a reciprocable carriage frame 236. As shown in FIGS. 11 and 23, one end of the frame 236 is connected via a depending arm 238 to the piston rod 240 of the previously mentioned hydraulic cylinder 58. The frame 236 supports two fixed platforms, a platform 242 for receiving carrier baskets from the primary chain PC and for delivering the baskets to the secondary chain SC, and a platform 244 for receiving carrier baskets CB from the secondary chain SC and delivering them back to the primary chain.

The carrier baskets CB (FIG. 11) on the descending reach of the primary chain PC in the inlet water leg 40 characteristically tend to swing about their suspending support pins 196. For this reason, the platform 242 (FIG. 23) is provided with an upwardly and outwardly extending guide flange 246 which is arranged to engage the guide brackets 108 on the descending carrier basket CB in order to guide the carrier basket onto rollers 248 which form the support surface of the platform 242. Due to the heavy weight of the loaded carrier basket, the rollers 248, plus the guide bracket 246, facilitate centering of the carrier basket onto the platform 242.

At the same time a carrier basket CB is being deposited on the platform 242, another carrier basket CB is being deposited from the reach 62 of the secondary conveyor chain SC onto a transfer carriage platform 244. Platform 244 also includes a guide flange 250 and an upper surface comprising rollers 252, both of which function in the same manner as the corresponding parts of the platform 242 to center the basket thereon. It will be noted that the platform 242 includes a stop member 254 which faces the secondary conveyor chain SC to prevent the carrier basket from rolling off the platform. The platform 244 includes a stop member 256 which faces the primary chain PC; the stop member 256 is explained in conjunction with FIGS. 11, 26 and 27.

With reference now to FIGS. 26 and 27, the lower bights of the chain guides 122 are secured to side plates 260 (only one of which is shown) suitably supported from the walls of the steam processing leg 42. Interconnecting said side plates is a stiffening bracket 262, and support channels 264, 266 and 268. The support channels 266 and 268 support depending stop members 270 and 272, FIGS. 26 and 27.

When the transfer carriage TC is advanced from the position shown in FIG. 2 to that of FIG. 4, the fixed stop member 270 is contacted by the carrier basket CB to push the basket against the guide bracket 246. When the transfer carriage TC is retracted from the position of FIG. 4 to the position shown in FIGS. 2 and 26, the stop member 256 on the transfer carriage platform 244 strikes the fixed stop members 272 to limit the transfer carriage movement in the retracting direction.

Referring to FIG. 27, the support channel 264 carries a camming plate 274 which, as shown in FIG. 26, is arranged to be contacted by the adjacent guide bracket 108 of each ascending carrier basket CB, to inhibit swinging movement of the baskets. Similarly, when the carrier baskets are on the descending flight 62 of the secondary chain SC, the guide bracket 108 can contact the guide bracket 250 on the platform 244. By this arrangement, the carrier basket which is being deposited upon the platform 244 is cammed by the guide strap 250 to a central position upon the platform, and the rollers 252 facilitates this centering movement of the relatively heavy carrier basket. The guide strap 246 on the platform 242 functions in a similar manner.

FIG. 25 illustrates, via several phantom line positions for a carrier basket CB, the manner in which the guide plate 246 centers a carrier basket descending onto the platform 242 from the primary conveyor chain PC (FIG. 11).

When a carrier basket CB has been picked up from the platform 242, as shown in FIG. 4, and begins to ascend through the steam processing leg 42, an outside guide member 280 (FIGS. 26 and 28) on the adjacent inner surface of the shell of the processing leg 42 is arranged to limit swinging movement of the carrier baskets by engaging the adjacent guide strap 108a on each carrier basket. Near the upper end of the steam processing leg 42 (FIG. 28) the carrier baskets are carried over the sprockets 128 and still have a tendency to swing. To limit such swinging movement, the upper flange 90 of the carrier basket is arranged to move under a horizontal guide rail 282, which is suspended within the steam processing leg to keep such swinging movement within acceptable limits.

Basket Loading and Unloading

In the embodiment disclosed, the basket loader BL (FIGS. 1, 29 and 31) and the basket unloader BU, are basically commercially available units manufactured by Busse Bros. Inc. of Randolph, Wisconsin, the loader BL being designated as a Model PL-4 retort crate loader and the unloader BU being designated as a Model BD3-H hydraulic retort crate unloader. Interconnecting the basket loader BL and the basket unloader BU is the previously mentioned basket conveyor BC (FIG. 1) which serves to transfer emptied baskets CB from the basket unloader BU to the basket loader BL for filling and recycling through the hydrostatic cooker.

Considering first the basket unloader BU (FIGS. 29 and 31) the full baskets CB delivered by the return or pusher conveyor 84 through the cooling tunnel 82 are sequentially delivered to an intermittent chain conveyor 292 driven by a motor M5. As the incoming basket is delivered on the conveyor 292, it contacts a normally closed switch SW1 (FIG. 29) to deenergize the motor M5 and stop the conveyor 292. In this position the basket is centered over a hydraulic cylinder 294 having a lifting pad (not visible) which can ascend through the open bottom frame of the carrier basket CB and lift the contents via the bottom plate 102.

Normally open contacts of the switch SW1 energize the hydraulic cylinder 294 to elevate the contents of the basket CB sufficiently to place the upper layer of containers C (FIG. 31) therein horizontally above the conveying surface of an adjacent discharge conveyor 296, which is driven by a motor M6. In this position, a striker blade 298 carried by a sweep arm assembly 300 is arranged to be retracted by a hydraulic cylinder 302 to sweep the uppermost layer of containers onto the discharge conveyor 296 for removal to associated processing apparatus. This sequence is automatically repeated layer by laryer until all of the cans and spacer plates 102 have been removed from the carrier basket CB. Since the details of operation of this commercially available unloader BU are not critical to the invention, they are not completely described.

After the lowermost layer of containers is thus removed, the basket conveyor BC is actuated so as to lift the carrier basket CB by its hangers 106 and deliver the empty basket to the basket loader BL. For the latter purpose, the basket conveyor BC comprises a pair of conveying chains 304 which carry basket support pins 306 that are similar to those described in connection with FIGS. 13 and 14. The chains 304 are trained around lower and upper pairs of sprockets 308 and 310 and are driven by a motor M7 by means of a chain and sprocket drive train 312 to the upper drive shaft 314 for the sprockets 310. As an empty basket CB is deposited by the basket conveyor BC upon an input conveyor 316 of the basket loader BL, the basket depresses the actuator of a switch SW2.

As presently described, actuation of the switch SW2 energizes a motor M4 which powers the input conveyor 316 to deliver the empty basket into vertical alignment with a hydraulic platform cylinder 318. At this time, the empty basket in alignment with the cylinder 318 strikes the actuator of a switch SW3 to deenergize the motor M4.

As shown in the circuit diagram of FIG. 30, actuation of the switch SW2 by the incoming empty basket energizes a relay coil RA which is in series connection, between power input lines L1 and L2, with normally closed contacts B1 of a relay B. The relay coil B is in series connection between the lines L1 and L2 through the switch SW3.

Thus, as the switch SW2 is closed by the deposited basket CB, the relay coil A is energized to close normally open holding contacts A1 for the relay A as well as closing normally open contacts A2 which are in series with the motor M4. This energizes the motor M4 to start the conveyor 316 and advance the basket CB toward the basket loader BL. When the basket closes the switch SW3, the relay coil B is energized to open the normally closed contacts B1 and deenergize the relay coil A. This returns the relay contacts A2 to open condition, and deenergizes the motor M4 when the empty basket CB is aligned with the hydraulic cylinder 318 as previously described. By means not shown, the hydraulic cylinder 318 is energized to elevate a lifting pad (not shown) on the upper end of the piston rod of the cylinder, into a position level with the input reach 320 (FIG. 31) of an input conveyor for receiving and lowering a tier of filled containers into the empty basket CB aligned therewith.

Basket loader BL operates to collect one tier of cans on the conveyor 320 against an outlet gate 322 within the lateral confines of a frame having side guides 324 and a hydraulically operated pusher arm 326. When one tier of cans has been thus assembled in the frame, the frame and pusher arm 326 are advanced toward the empty basket CB aligned therewith and one entire tier of cans is deposited upon the spacer plate 102. Subsequently, the hydraulic cylinder 318 (FIG. 29) is energized to lower the tier of cans into position to receive a second tier of cans on an interposed spacer plate 102. When the entire basket CB has been loaded in the described manner, the conveyor 316 (FIG. 29) is energized to discharge the loaded basket onto the input conveyor 220 and deliver the basket to the ascending reach 46 (FIG. 1) of the primary chain PC for transport through the hydrostatic cooker in the manner previously described.

As in the case of the basket unloader BU, the basket loader BL is a conventional, commercially available device, the details of its operation are not critical to the present invention.

Automatic Control System

FIGS. 32 and 33 are diagrams which illustrate the essential elements of an automatic electrical control system for governing the interaction of the various components already described. A switch control disc 330 (FIG. 32) is driven by a chain and sprocket drive train 332 from the shaft 126 which powers the secondary chain SC. The disc 330 includes switch-actuating pins 334 and 336 that are 180° apart, and is driven in timed relation with both the primary chain PC and the secondary chain SC. The switch control disc 330 rotates one half revolution for every container passing a given point on the secondary chain SC. Spaced around the periphery of the switch control disc 330 are limit switches 2LS, 6LS, 4LS and 11LS. In order to correlate the action of these switches with the movement of the secondary chain SC, selected basket support pins 210 are illustrated along the bottom portion of the chain SC, and are respectively identified as to their analogue positions relative to the limit switches 2LS, 6LS, 4LS and 11LS by an adjacent identification of the associated switch in parentheses. Two chain pins 196 are illustrated in FIG. 32 ono the primary conveying chain PC. One pin 196 is adjacent a switch 13LS and is identified by the adjacent legend (13LS). The other pin 196 is at the lowermost point, 164, in the cooling chamber 76. The latter pin is also identified by the adjacent switch legend (13LS).

With reference to the circuit diagram of FIG. 33, lines 1 and 2 illustrate a main switch LS1 which is in series with power input lines L1 and L2, with relay contacts C1, C2, and with a motor M8 that powers a hydraulic pump, not shown, for all of the hydraulic components of the system. Closing the switch LS1 energizes a transformer T to power the balance of the control circuit. A start button 344, line 4, is arranged to energize the coil of a relay C having holding contacts C3, between lines 4 and 5, to maintain the coil of the relay C in energized condition and close the relay contacts C1 and C2 to energize the pump motor M8. A start switch 346, line 13, is depressed to energize the motor M2 for the primary and secondary chains PC and SC through normally closed relay contacts E1. A relay coil D, line 12, is also energized when the start switch 346 is depressed, closing the holding contacts D1 across the start switch. It is assumed that switch 346 has been actuated to set both the primary and secondary chains PC and SC in motion.

The control circuit shown in FIG. 33 incorporates two latching relays, a relay LRA and a relay LRB. For illustrative purposes only, each relay is depicted with two actuating coils, and is of the type having a set of open contacts and a set of closed contacts. Each time either one of the coils is energized, the contacts of the relay change their positions so that a contact which has been formerly closed is opened, and the other contact is closed. Referring now to line 7, the latching relay LRA includes a coil 348 and a coil 350, plus contacts 352 and 354. If the coil 348 is energized, the contacts 352 open and the contacts 354 close. Likewise, if the coil 350 is energized, the contacts 352 open and the contacts 354 close. These operating principles are the same for the latching relay LRB, which includes coils 356 and 358, and contacts 360 and 362.

When the primary and secondary chains PC and SC are set in motion as above mentioned, the switch control disc 330 (FIG. 32) moves the actuating pin 334 toward the limit switch 2LS. The switch 2LS, line 7 on FIG. 33, is in series with the coil 348 of the latching relay LRA through the closed contacts 352 of the relay. Upon this momentary actuation of the switch 2LS, the contacts 352 of the latching relay LRA to deenergize the coil 348. When the coil was energized, its associated latching relay contacts LRA1 line 6 closed, contacts LRA2 line 9 opened, and contacts LRA3 line 14 closed.

The respective functions of the latter operation are as follows: Closed contact LRA1 line 6 energizes a solenoid operated valve V1 which is associated with the hydraulic cylinder 58 (FIG. 32) to admit pressurized fluid to the base end of said cylinder. The transfer carriage TC thus begins to advance toward the right hand side of FIG. 32, while the primary and secondary chains PC and SC are still in motion. When the cooker is initially placed in operation and before the hydraulic fluid in the system warms up to operating temperature, the hydraulic cylinder 58 will operate slower than usual before the hydraulic fluid thins out. In order to prevent the slow-moving transfer carriage TC from arriving at its ultimate position too late to index two carrier baskets with the basket support pins which will pick up the baskets, both the primary and secondary chains PC and SC are temporarily stopped. For this purpose, the limit switch 4LS, FIG. 32, and line 14, FIG. 33, is arranged to deenergize the relay E, thereby opening the relay contacts E1 on line 13 and deenergizing the main drive motor M2. This is effected by the switch actuating pin 336 striking the actuator of the limit switch 4LS. On the other hand, if the transfer carriage TC is operating at its usual speed, a plunger 364, FIG. 32, which is coupled to the transfer carriage, carries a switch actuator 366 into contact with a limit switch 3LS at the end of the transfer carriage stroke.

Referring to FIG. 33, momentary actuation of the switch 3LS, line 8, energizes the coil 350 of the latching relay LRA (the relay contacts 354 having previously been left in a closed condition) so that the relay contacts LRA1, line 6, LRB1, line 9, and LRA3, line 14, return to their illustrated positions. Shortly thereafter, the limit switch 6LS, line 10, is closed by the switch actuator 334 (FIG. 32) to energize the coil 356 of the latching relay LRB. This actuation of the relay LRB opens the contacts 360 and closes the contacts 362. Further, contacts of the relay LRB in lines 6, 9 and 15 are changed from the positions illustrated. Thus, the contacts LRB2, line 6, open to deenergize the solenoid operated valve V1 and stop the forward motion of the transfer carriage TC. AT the same time, the closed contacts LRB1, line 9, operate in conjunction with the now closed contacts LRA2 on the same line to energize a solenoid operated valve V2 with which admits pressurized fluid to the piston rod end of the hydraulic cylinder 58 and immediately begins to retract the transfer carriage TC to the position illustrated in FIG. 32.

It will be understood that between the actuation of the limit switches 3LS and 6LS as above described, there is a dwell period for the transfer carriage at the forward limit of its stroke. During this time, the carriage support pins 210 (6LS) shown on FIG. 32 pick up a carrier basket CB from the platfrom 242 of the carriage for movement upward by the reach 60 of the secondary chain SC. Similarly, the carrier basket on the platform 244 of the transfer carriage is picked up by the ascending reach 68 of the primary chain PC in the outlet water leg 44.

It is possible that the transfer carriage TC during its return movement to the FIG. 32 position, is still lagging behind its normal operating speed if the hydraulic fluid has not thinned out. Accordingly, means are provided to temporarily stop the primary and secondary chains PC and SC to assure that a carrier basket on the ascending reach 48 of the primary chain PC is not prematurely delivered, and that a carrier basket on the descending reach 62 of the secondary conveyor SC is not prematurely delivered. Thus, the limit switch 11LS (FIG. 32) will be actuated by the switch actuating pin 336 before the switch actuator 366 of the plunger 364 actuates a limit switch 10LS. As shown in FIG. 33, momentary actuation of the switch 11LS, line 15, acts through the now closed contacts LRB3 to energize the relay coil E. Accordingly, the relay contacts E1, line 13, open to deenergize the motor M2 which drives the primary and secondary chains PC and SC. Meanwhile, the solenoid operated valve V2 line 9 remains energized and continues to retract the transfer carriage TC.

At the end of the retracting stroke of the transfer carriage, the limit switch 10LS, line 11, is closed by the actuator 366 to energize the coil 358 of the latching relay LRB through the closed relay contacts 362. The relay contacts LRA2, line 9, are thus opened to deenergize the solenoid operated valve V2 and stop the transfer carriage TC. All of the various components of the control system shown in FIGS. 32 and 33 are now in their originally described conditions for a repetition of the cycle just described. It should also be noted that the latching relays LRA and LRB function as memory devices which, if the main power source is interrupted for any reason, will assure that the operating cycle which was interrupted will resume in exactly the same condition upon reenergization of the control circuit.

A switch 13LS, FIG. 32, is positioned adjacent the ascending reach of the primary conveyor PC and is arranged to be actuated when a basket support pin 196 rises past the actuator of the switch. AT the same time, another basket support pin 196 is at the lowermost portion of the primary conveyor PC in the cooling tower 76. When the pin 196 trips the switch 13LS, line 16, the return conveyor motor M3 is energized to advance the basket to the left, FIG. 32. Previously, a pusher 370 on the lower reach of the return conveyor had held a switch 14LS (shown on line 17) in open condition. When the return conveyor was energized by the motor M3, the switch 14LS closed. Shortly after this condition occurred, the pin 196 advanced beyond the switch 13LS and allowed it to return to open condition. The motor M3 continues to run and drive the return conveyor 84 until a succeeding pusher lug actuates the switch 14LS to open the switch and deenergize the motor M3.

FIGS. 34 and 35 illustrate a hydrostatic cooker especially adapted to handle glass containers in carrier baskets 372. Thus, the apparatus includes a water inlet leg 40a, a processing leg or chamber 42a, and a water outlet leg 44a. The processing leg 42a is supplied with an overriding pressure of steam and air to maintain the water level at the bottom portion of the processing leg. The actual cooking process is carried out by hot water sprays emanating from manifolds 374 (FIG. 35) directed into the carrier baskets 372 which are ascending on the reach 60a of the secondary chain. Since the only access for the water sprays into the baskets is between the top of one basket and the adjacent bottom of the next basket, the water sprays are directed generally horizontally. A plurality of the spray manifolds 374 (not shown) extend for substantially the total vertical extent of the processing chamber 42a.

Mounted between vertically extending chain guides 122a for the secondary chain SC, and the wall of the processing leg 42a, are receptacles 376 that are arranged to collect the water which drains from the bottom portions of the baskets 372. A conduit 378 associated with each receptacle 376 returns the water to a central point where it is heated for recirculation to the manifolds 374.

In the case of glass jars, it is desirable to gradually raise the temperature of jars entering the chamber 42a to the required process temperature to avoid thermal cracking, and to gradually lower the temperature of jars leaving the chamber 42a for the same reason. This is accomplished by heating the water for several lower manifolds 374 to one temperature (say 225°F) wherein the water for the remaining manifolds will be additionally heated to a higher temperature (say 240°F).

A typical carrier basket 372 for glass containers is illustrated in FIG. 36, and includes outer walls 380 which are imperforate except for drain apertures 382 near the bottoms of the end walls to drain the water into the receptacles 376. Glass jars J are loaded into the carrier basket 372 with interposed perforate spacer plates 102a, the bottom tier of jars resting upon a removable floor 383. The floor 383 includes a perforate upper plate 384, an imperforate lower plate 386, and horizontally apertured spacer bars 388 which interconnect the two plates. The floor 383 rests upon inturned lower flanges 390, and between fixed end walls 392 that are apertured near their lower ends in horizontal alignment with the chamber defined by the two floor plates 384 and 386.

Intermediate each end wall of the carrier basket and the wall 392, a baffle plate 394 is secured to the flange 390 and to the front and rear walls of the basket to form two vertical flow channels which direct overflow liquid from the basket to the apertures 382. Thus, water from the manifolds 374, FIG. 35, fills each carrier basket 372 to totally immerse the jars J, and the overflow liquid circulates downward through the upper floor plate 384, thence outward through the apertured spacers 388, through the apertures in the end walls 392, and when the water rises above the baffle plates 394, out the apertures 382 to be collected in the receptacles 376 for recirculation and reheating. The same type of basket loader and unloader previously described can be used with the basket 372, since the floor plate 383 is upwardly displaceable from the flanges 390.

In the modified cooker shown in FIGS. 37 and 38, the primary chain PCb can be directly loaded and unloaded with carrier baskets CB, without the necessity of the (basket) conveyor (BC) (FIG. 1). The primary conveyor PCb, FIG. 37, extends through the outlet leg 44b and the cooling leg 76b as previously described, except that the lowermost reaches 400 of the primary conveyor extend horizontally through the cooling tunnel 82b and straddle the return conveyor 84b. At the inlet end of the cooker (FIG. 38) the primary chain PCb extends under a basket loader BLb and a basket unloaded BUb.

Intermediate the basket unloader BUb and the inlet water leg 40b is a tilt table unit 402 which is arranged to lift one side of the carrier basket CB to drain the water from the basket. With reference to FIGS. 38 and 40, the tilting unit 402 includes a hydraulic cylinder 404 having a hook end 406 which is arranged to lift the hanger 106 of the carrier basket CB. At the other side of the conveyor 84b a stop bar 408 is arranged to prevent the carrier basket from sliding endwise off the conveyor when it is tilted. After the basket CB has been drained and returned to the conveyor 84b, it advances into vertical alignment with a hydraulic cylinder 410 which is a part of the unloaded BUb and serves to elevate the contents, tier by tier, for removal.

When all of the containers have been removed and the floor 102 (FIG. 39) lowered into place, the basket advances to the basket loader BLb where a hydraulic cylinder 412 elevates the floor 102 once more and tiers of containers with intermediate spacer plates between the tiers are loaded into the empty basket. Immediately downstream of the basket loading station, the primary conveyor PCb is guided upward by its associated chain guide members 414 and into the top of the inlet water leg 40b in the same manner previously described. As one of the pairs of lift pins 210b on the primary chain straddle a carrier basket CB which was previously deposited there after having been loaded by the basket loader BLb, the lift pins 210b of the primary chain ascend into supporting relation with the outwardly projecting hangers 106 of the loaded carrier basket and convey the basket upwardly and thence through the machine in the manner already outlined.

The carrier basket loader and unloader BLb and BUb FIG. 39 is similar to the unloader and loader previously described, and are manufactured by Busse Bros. Inc. of Randolph, Wisconsin. Thus, the basket loader includes a powered sweep arm 326b, and the basket unloader includes a hydraulic cylinder 302b powering a sweep arm 298b. Other than directional differences, the loader and unloader are essentially the same as those described in connection with FIGS. 29 and 31.

In the appended claims, it is to be assumed that use of the terms "primary chain" and "secondary chain" does not imply that these units necessarily consist of a single chain, because these terms are also intended to encompass the preferred form wherein each chain actually has spaced, parallel cooperating reaches.

Although the best mode contempleted for carrying out the present invention has been herein shown and described, it will be apparent that modification and variation may be made without departing from what is regarded to be the subject matter of the invention.

We claim:

1. In a sterilizer of the hydrostatic type for products in containers, said sterilizer having inlet and outlet water legs, an intermediate steam processing leg, water leg means for interconnecting the lower ends of said legs, means for conveying containers through the sterilizer comprising chain means running through said legs, product carriers spaced along said chain means and means for driving said chain means; the improvement wherein said conveying means comprises endless primary chain means running through said inlet and outlet legs, secondary chain means running through said processing leg, supports for detachably mounting product carriers uniformly spaced along said primary chain means at one spacing and similar supports uniformly spaced along said secondary chain means at a much closer spacing, said chain driving means comprising means for driving said primary and secondary chain means in synchronism and for driving said primary chain means at a higher speed than that of said secondary chain means, transfer means disposed in said interconnecting water leg means for transferring product carriers from carrier supports on a reach of said primary chain means that is leaving said inlet water leg to carrier supports on a reach of said secondary chain means that is entering said processing leg and for transferring product carriers from carrier supports on a reach of said secondary chain means that is leaving said processing leg to carrier supports on a reach of said primary chain means that is entering said outlet water leg.

2. The sterilizer of claim 1, wherein the spacing of the supports on said primary chain means is least twice the length of the spacing on said secondary chain means.

3. In a sterilizer of the hydrostatic type for products in containers, said sterilizer having upright inlet and outlet water legs, an intermediate steam processing leg and water leg means for interconnecting the lower ends of said legs, means for conveying containers through the sterilizer comprising chain means running up and down through said legs, container carriers spaced along said chain means and means for driving said chain means; the improvement wherein said conveying means comprises endless primary chain means running through said water legs and separate endless secondary chain means running through said steam leg, supports spaced along said primary chain means at a relatively wide uniform spacing and along said secondary chain means at a closer uniform spacing, said carriers comprising baskets detachably carried by said supports, said chain driving means including means for driving said primary and secondary chain means in synchronism and for driving said primary chain means at a higher speed than that of said secondary chain means such that the same number of baskets on both said primary ans secondary chain means passes a fixed horizontal reference plane in a given period of time, transfer means disposed in said interconnecting water leg means for transferring baskets from a downwardly running reach of said primary chain means at a lower portion of said inlet water leg to an upwardly running reach of said secondary chain means at a lower portion of said processing leg, and for transferring baskets from a downwardly running reach of said primary chain means at a lower portion of said outlet water leg.

4. The sterilizer of claim 3, including the further improvement wherein said water and steam processing legs comprise vertically disposed cylindrical shells.

5. The sterilizer of claim 3, wherein said transfer means comprises horizontally reciprocable carriage means, said carriage means having two longitudinally spaced basket supporting platforms, the distance between the downwardly running reach of said primary chain means in said inlet water leg and the downwardly running reach of said secondary chain means equaling the distance between the upwardly running reach of said secondary chain means and the upwardly running reach of said primary chain means in said outlet water leg, said distance also equaling the distance between said transfer carriage means platforms, and means for reciprocating said carriage means through said distance and in synchronism with the motion of baskets on said chain means.

6. The sterilizer of claim 3, wherein said primary and secondary chain means each comprises laterally spaced chains, said basket supports comprise opposed pins projecting from said chains, and said baskets include downwardly open hangers for support by said pins.

7. The sterilizer of claim 6, wherein the basket supports on said secondary chain means include cantilever arms projecting outwardly from each of said spaced chains, said basket supporting pins being adjacent the free ends of said cantilever arms.

8. The sterilizer of claim 3, wherein each basket has an open top for receiving water, has means for holding water up to a certain level and has means to drain off water near the bottom of the basket while maintaining the water in the basket at said level, and wherein said sterilizer includes hot water sprays in said processing leg for filling the baskets with hot water, and water collecting troughs along the sides of said processing leg for collecting water that drains from said baskets.

9. The sterilizer of claim 8, wherein said baskets have an apertured false bottom plate, inner side walls that are apertured near the lower edge thereof, upstanding baffles between said inner side walls and adjacent outer side walls of the basket, and drain orifice means formed in a lower portion of said outer sdie wall.

10. The sterilizer of claim 8, wherein said basket contains layers of containers with perforate divider plates between said layers for conducting water down through the basket.

11. The sterilizer of claim 3, wherein the further improvement comprises a basket loading station near the lower portion of said water inlet leg and wherein said primary chain means comprises an endless chain that runs from said basket loading station up the outside of said water inlet leg, down through the inlet water leg, across through said interconnecting water leg means, up through said outlet water leg, and beneath said interconnecting water leg means back to the basket loading station.

12. The sterilizer of claim 11, wherein the further improvement comprises a basket unloading station near said basket loading station and return conveyor means separate from said primary chain means for conveying baskets of processed containers that have left said outlet water leg beneath said interconnecting water leg means to said basket unloading station means for transferring baskets that have left said outlet water leg to said return conveyor means, and means for conveying unloaded baskets from said basket unloading station back to said basket loading station.

13. The sterilizer of claim 12, comprising means for operating said return conveyor intermittently.

14. The sterilizer of claim 12 comprising a water cooling tunnel running horizontally beneath said interconnecting water leg means, said return conveyor running through said cooling tunnel.

15. The sterilizer of claim 14 comprising a water cooling chamber projecting up from said cooling tunnel, said primary chain means running through said cooling chamber after leaving said outlet water leg, and cooling water sprays in said cooling chamber.

* * * * *

UNITED STATES PATENT OFFICE
CERTIFICATE OF CORRECTION

PATENT NO. : 3,927,976
DATED : Dec. 23, 1975
INVENTOR(S) : JAMES L. REIMERS ET AL

It is certified that error appears in the above-identified patent and that said Letters Patent are hereby corrected as shown below:

Column 1, line 22 "Mencocci" should be -- Mencacci --.

Column 1, line 37 "is" should be -- in --.

Column 2, line 64 after "primary" insert --"and"--.

Column 3, line 12 "coaveying" should be --"conveying"--.

Column 5, line 8 "in" should be --"at"--.

Column 7, line 55 "carries" should be --"portion"--.

Column 7, line 56 "carrier" should be --"carries"--.

Column 8, line 38 after "outlet" insert --"leg"--.

Column 12, line 3 "laryer" should be --"layer"--.

Column 13, line 32 "ono" should be --"on"--.

Column 14, line 13 after "LRA" insert --"open"--.

Column 14, line 59 "AT" should be --"At"--.

Column 15, line 3 "platfrom" should be --"platform"--.

Column 15, line 47 "AT" should be --"At"--.

Column 18, line 21 after "is" insert --"at"--.

Column 18, line 44 "ans" should be --"and"--.

Column 18, line 52 "primary" should be --"secondary"--

UNITED STATES PATENT OFFICE
CERTIFICATE OF CORRECTION

PATENT NO. : 3,927,976
DATED : Dec. 23, 1975
INVENTOR(S) : JAMES L. REIMERS et al

It is certified that error appears in the above—identified patent and that said Letters Patent are hereby corrected as shown below:

Column 18, line 53 after "means" insert --"to an upwardly running reach of said primary chain means"--.

Column 19, line 29 "sdie wall." should be --"side walls."--.

Signed and Sealed this

Eighteenth Day of January 1977

[SEAL]

Attest:

RUTH C. MASON
Attesting Officer

C. MARSHALL DANN
Commissioner of Patents and Trademarks